US012567944B2

(12) United States Patent
    Park

(10) Patent No.: US 12,567,944 B2
(45) Date of Patent: Mar. 3, 2026

(54) HOMOMORPHIC ENCRYPTION CALCULATING ACCELERATOR AND ENCRYPTION SYSTEM INCLUDING THE SAME

(71) Applicant: Electronics and Telecommunications Research Institute, Daejeon (KR)

(72) Inventor: Seong-Cheon Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 215 days.

(21) Appl. No.: 18/447,113

(22) Filed: Aug. 9, 2023

(65) Prior Publication Data

US 2024/0056286 A1 Feb. 15, 2024

(30) Foreign Application Priority Data

Aug. 11, 2022 (KR) ........................ 10-2022-0100886
Jul. 6, 2023 (KR) ........................ 10-2023-0087598

(51) Int. Cl.
  *H04L 9/00* (2022.01)
  *H04L 9/06* (2006.01)
(52) U.S. Cl.
  CPC ........... *H04L 9/008* (2013.01); *H04L 9/0618* (2013.01)
(58) Field of Classification Search
  CPC ..... H04L 9/008; H04L 9/0618; H04L 9/3093; H04L 2209/125
  See application file for complete search history.

(56) References Cited

U.S. PATENT DOCUMENTS

| 9,852,110 B2 | 12/2017 | Jang | |
| 2012/0166507 A1 | 6/2012 | Son et al. | |
| 2023/0327849 A1* | 10/2023 | Mert | ...................... H04L 9/008 |
| | | | 380/28 |

FOREIGN PATENT DOCUMENTS

| KR | 101952547 B1 | 2/2019 |
| KR | 1020210067961 A | 6/2021 |

OTHER PUBLICATIONS

NTTU: An Area-Efficient Low-Power NTT-Uncoupled Architecture for NTT-Based Multiplication, by Zhang et al., published 2020 (Year: 2020).*

(Continued)

*Primary Examiner* — Vu V Tran
(74) *Attorney, Agent, or Firm* — WILLIAM PARK AND ASSOCIATES LTD.

(57) ABSTRACT

Disclosed is a homomorphic encryption calculating accelerator which includes a parallel processing unit performing a polynomial multiplication operation in parallel on a plurality of input data corresponding to a degree N polynomial of a homomorphic ciphertext and a combination unit generating a plurality of output data by performing the polynomial multiplication operation on an output of the parallel processing unit. The parallel processing unit includes a first parallel processing element performing the polynomial multiplication operation on first input data among the plurality of input data and a second parallel processing element performing the polynomial multiplication operation on second input data among the plurality of input data. The first parallel processing element and the second parallel processing element are arranged in parallel, and each of the first parallel processing element and the second parallel processing element has a single-path delay feedback (SDF) number theoretic transform (NTT) hardware structure.

12 Claims, 16 Drawing Sheets

(56) References Cited

OTHER PUBLICATIONS

D. Jayakumar et al., Design of Combined Radix-2, Radix-4 and Radix-8 based Single Path Delay Feedback (SDF) FFT, Indian Journal of Science and Technology, vol. 9(45), Dec. 2016.
Soyeon Choi et al., Efficient Partially-parallel NTT Processor for Lattice-based Post-quantum Cryptography, Journal of Semiconductor Technology and Science, vol. 22, No. 6, Dec. 2022, pp. 459-474.
Renteria-Mejia, Claudia Patricia et al., High-Throughput Ring-LWE Cryptoprocessors; IEEE Transactions of Very Large Scale Integration (VI SI) Systems vol. 25, No. Aug. 8, 2017 p. 2332-2345, USA.
Zhang, Neng et al., NTTU: An Area-Efficient Low-Power NTT-Uncoupled Architecture for NTT-Based Multiplication; IEEE Transactions on Computers. vol. 69 No. 4, Apr. 2020 p. 520-533, China.

\* cited by examiner $X[0]$ ⟶ ⟶ $Y[0]$ $W^n_N$ $X[1]$ ⟶ $-W^n_N$ ⟶ $Y[1]$

[Radix-2 , 1 Stage]

STG

Feedback Loop(FL)

PEO[2^3]

[Radix-4 , 1 Stage]

Figure 11:
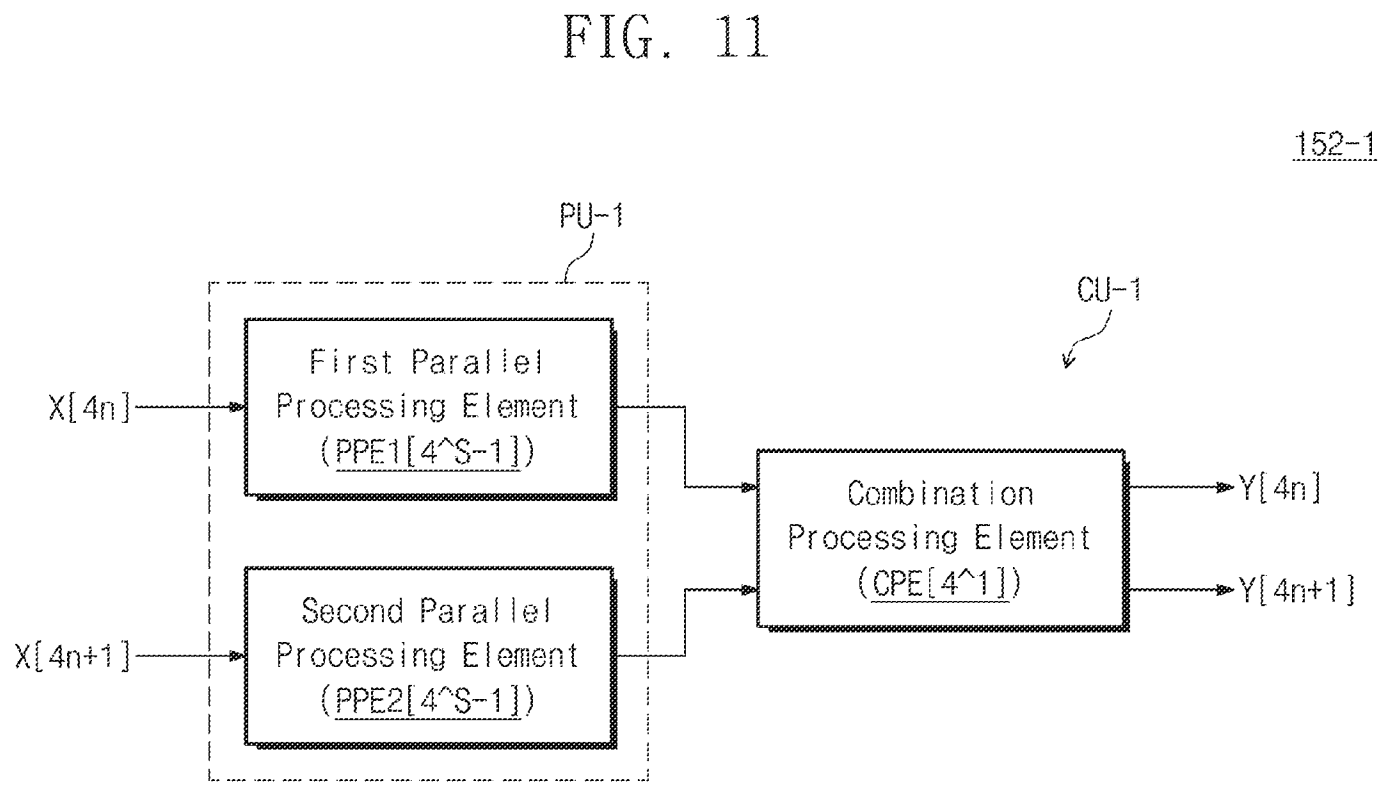

First Parallel Processing Element (PPE1[4^S-1])

Second Parallel Processing Element (PPE2[4^S-1])

Combination Processing Element (CPE[4^1])

| Natural Sorting | |
|---|---|
| 0 | 32 |
| 1 | 33 |
| 2 | 34 |
| 3 | 35 |
| 4 | 36 |
| 5 | 37 |
| 6 | 38 |
| 7 | 39 |
| 8 | 40 |
| 9 | 41 |
| 10 | 42 |
| 11 | 43 |
| 12 | 44 |
| 13 | 45 |
| 14 | 46 |
| 15 | 47 |
| 16 | 48 |
| 17 | 49 |
| 18 | 50 |
| 19 | 51 |
| 20 | 52 |
| 21 | 53 |
| 22 | 54 |
| 23 | 55 |
| 24 | 56 |
| 25 | 57 |
| 26 | 58 |
| 27 | 59 |
| 28 | 60 |
| 29 | 61 |
| 30 | 62 |
| 31 | 63 |

Bit-reversal
Conversion
→

| Bit-reversal Sorting | |
|---|---|
| 0 | 1 |
| 32 | 33 |
| 16 | 17 |
| 48 | 49 |
| 8 | 9 |
| 40 | 41 |
| 24 | 25 |
| 56 | 57 |
| 4 | 5 |
| 36 | 37 |
| 20 | 21 |
| 52 | 53 |
| 12 | 13 |
| 44 | 45 |
| 28 | 29 |
| 60 | 61 |
| 2 | 3 |
| 34 | 35 |
| 18 | 19 |
| 50 | 51 |
| 10 | 11 |
| 42 | 43 |
| 26 | 27 |
| 58 | 59 |
| 6 | 7 |
| 38 | 39 |
| 22 | 23 |
| 54 | 55 |
| 14 | 15 |
| 46 | 47 |
| 30 | 31 |
| 62 | 63 |

FIG. 14B

| $\phi_{S0}$ | $\phi_{S1}$ | $\phi_{S2}$ | $\phi_{S3}$ | $\phi_{S4}$ | $\phi_{S51}$ | $\phi_{S52}$ |
|---|---|---|---|---|---|---|
| 32 | 16 | 8 | 4 | 2 | 1 | 33 |
| | 48 | 40 | 36 | 34 | 17 | 49 |
| | | 24 | 20 | 18 | 9 | 41 |
| | | 56 | 52 | 50 | 25 | 57 |
| | | | 12 | 10 | 5 | 37 |
| | | | 44 | 42 | 21 | 53 |
| | | | 28 | 26 | 13 | 45 |
| | | | 60 | 58 | 29 | 61 |
| | | | | 6 | 3 | 35 |
| | | | | 38 | 19 | 51 |
| | | | | 22 | 11 | 43 |
| | | | | 54 | 27 | 59 |
| | | | | 14 | 7 | 39 |
| | | | | 46 | 23 | 55 |
| | | | | 30 | 15 | 47 |
| | | | | 62 | 31 | 63 |

TWDF-1

| $\phi_{S0}$ | $\phi_{S1}$ | $\phi_{S2}$ | $\phi_{S3}$ | $\phi_{S4}$ | $\phi_{S51}$ | $\phi_{S52}$ |
|---|---|---|---|---|---|---|
| 32 | 16 | 8 | 4 | 2 | 1 | 33 |
|  |  | 24 | 20 | 18 | 3 | 35 |
|  |  |  | 12 | 10 |  |  |
|  |  |  | 28 | 26 |  |  |
|  |  |  |  | 6 |  |  |
|  |  |  |  | 22 |  |  |
|  |  |  |  | 14 |  |  |
|  |  |  |  | 30 |  |  |

AD

| | Bit-reversal Conversion → | |
|---|---|---|
| 0 | | 0 |
| 4 | | 16 |
| 8 | | 8 |
| 12 | | 24 |
| 16 | | 4 |
| 20 | | 20 |
| 24 | | 12 |
| 28 | | 28 |

FIG. 16A

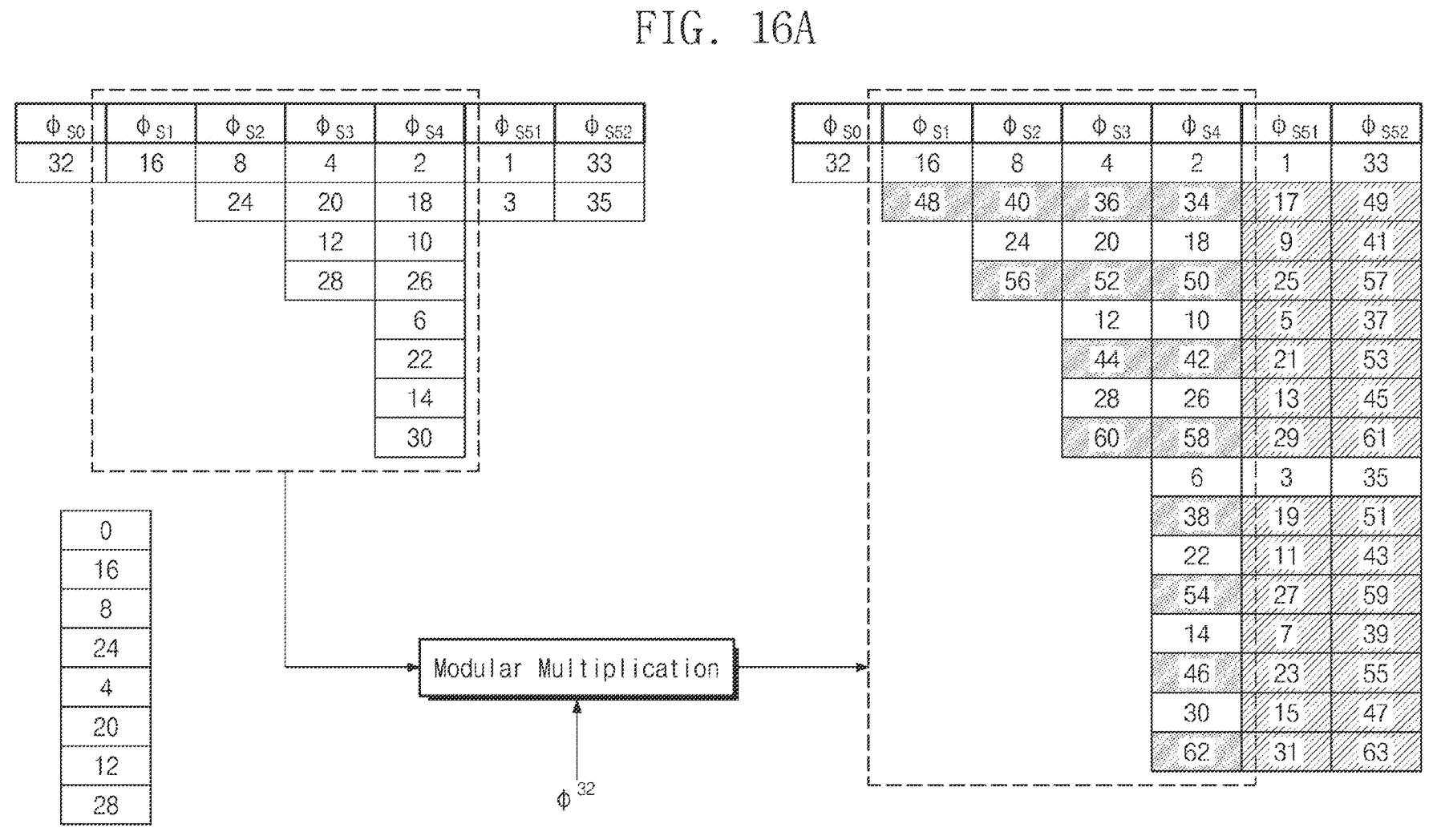

Top table:

| φS0 | φS1 | φS2 | φS3 | φS4 | φSS1 | φSS2 |
|---|---|---|---|---|---|---|
| 32 | 16 | 8 | 4 | 2 | 1 | 33 |
|  | 48 | 40 | 36 | 34 | 17 | 49 |
|  |  | 24 | 20 | 18 | 9 | 41 |
|  |  | 56 | 52 | 50 | 25 | 57 |
|  |  |  | 12 | 10 | 5 | 37 |
|  |  |  | 44 | 42 | 21 | 53 |
|  |  |  | 28 | 26 | 13 | 45 |
|  |  |  | 60 | 58 | 29 | 61 |
|  |  |  |  | 6 | 3 | 35 |
|  |  |  |  | 38 | 19 | 51 |
|  |  |  |  | 22 | 11 | 43 |
|  |  |  |  | 54 | 27 | 59 |
|  |  |  |  | 14 | 7 | 39 |
|  |  |  |  | 46 | 23 | 55 |
|  |  |  |  | 30 | 15 | 47 |
|  |  |  |  | 62 | 31 | 63 |

Bottom table:

| φS0 | φS1 | φS2 | φS3 | φS4 | φSS1 | φSS2 |
|---|---|---|---|---|---|---|
| 32 | 16 | 8 | 4 | 2 | 1 | 33 |
|  |  | 24 | 20 | 18 | 3 | 35 |
|  |  |  | 12 | 10 |  |  |
|  |  |  | 28 | 26 |  |  |
|  |  |  |  | 6 |  |  |
|  |  |  |  | 22 |  |  |
|  |  |  |  | 14 |  |  |
|  |  |  |  | 30 |  |  |

Modular Multiplication

φ32

| 0 |
| 16 |
| 8 |
| 24 |
| 4 |
| 20 |
| 12 |
| 28 |

| IN1 | IN2 | Result |
|-----|-----|--------|
| 1 | 0 | 1 |
| 1 | 16 | 17 |
| 1 | 8 | 9 |
| 1 | 24 | 25 |
| 1 | 4 | 5 |
| 1 | 20 | 21 |
| 1 | 12 | 13 |
| 1 | 28 | 29 |
| 3 | 0 | 3 |
| 3 | 16 | 19 |
| 3 | 8 | 12 |
| 3 | 24 | 27 |
| 3 | 4 | 7 |
| 3 | 20 | 23 |
| 3 | 12 | 15 |
| 3 | 48 | 31 |

HOMOMORPHIC ENCRYPTION CALCULATING ACCELERATOR AND ENCRYPTION SYSTEM INCLUDING THE SAME

CROSS-REFERENCE TO RELATED APPLICATIONS

This application claims priority under 35 U.S.C. § 119(a) to Korean Patent Application Nos. 10-2022-0100886 filed on Aug. 11, 2022, and 10-2023-0087598 filed on Jul. 6, 2023, in the Korean Intellectual Property Office, the disclosures of which are incorporated by reference herein in their entireties.

BACKGROUND

Embodiments of the present disclosure described herein relate to homomorphic encryption, and more particularly, relate to a homomorphic encryption calculating accelerator and an encryption system including the same.

Fully homomorphic encryption (FHE) may support computations or combinations between ciphertexts in an encrypted form, that is, without decrypting the ciphertexts. The fully homomorphic encryption may be implemented based on various algorithms such as a TFHE (Torus FHE) algorithm, a BGV (Brakerski-Gentry-Vaikuntanathan) algorithm, a BFV (Brakerski-Fan-Vercauteren) algorithm, and a CKKS (Cheon-Kim-Kim-Song) algorithm.

A homomorphic ciphertext is expressed as a higher-order polynomial. In this case, a multiplication operation on ciphertexts requires a lot of time. Accordingly, to improve a speed with which homomorphic ciphertexts are computed, a hardware operator based on number theoretic transform (NTT) is used. However, because the size of the homomorphic ciphertext is very large, a computational structure or method using the NTT-based hardware operator is not yet practical.

SUMMARY

Embodiments of the present disclosure provide a homomorphic encryption calculating accelerator with improved performance and an encryption system including the same.

According to an embodiment, a homomorphic encryption calculating accelerator includes a parallel processing unit that performs a polynomial multiplication operation in parallel on a plurality of input data corresponding to a degree N polynomial of a homomorphic ciphertext, and a combination unit that generates a plurality of output data by performing the polynomial multiplication operation on an output of the parallel processing unit. The parallel processing unit includes a first parallel processing element that performs the polynomial multiplication operation on first input data among the plurality of input data, and a second parallel processing element that performs the polynomial multiplication operation on second input data among the plurality of input data. The first parallel processing element and the second parallel processing element are arranged in parallel, and each of the first parallel processing element and the second parallel processing element has a single-path delay feedback (SDF) number theoretic transform (NTT) hardware structure.

In an embodiment, the combination unit includes a first combination processing element that generates first output data and second output data by performing the polynomial multiplication operation on an output of the first parallel processing element and an output of the second parallel processing element.

In an embodiment, each of the first parallel processing element and the second parallel processing element includes (S−1) stages (S being a natural number greater than 1), the first combination processing element includes one stage, each of the stages included in the first parallel processing element, the second parallel processing element, and the first combination processing element has a Radix-R structure (R being a natural number), and the N, the S, and the R satisfy an equation: $N=S^R$.

In an embodiment, the R is 2, 4, 8, or 16.

In an embodiment, the parallel processing unit further includes a third parallel processing element that performs the polynomial multiplication operation on third input data among the plurality of input data, and a fourth parallel processing element that performs the polynomial multiplication operation on fourth input data among the plurality of input data. The first parallel processing element, the second parallel processing element, the third parallel processing element, and the fourth parallel processing element are arranged in parallel, and each of the third parallel processing element and the fourth parallel processing element has the SDF NTT hardware structure.

In an embodiment, the combination unit includes a first combination processing element that performs a polynomial operation on an output of the first parallel processing element and an output of the third parallel processing element, a second combination processing element that performs the polynomial operation on an output of the second parallel processing element and an output of the fourth parallel processing element, a third combination processing element that generates first output data and second output data by performing the polynomial multiplication operation on odd-numbered term outputs of each of the first combination processing element and the second combination processing element, and a fourth combination processing element that generates third output data and fourth output data by performing the polynomial multiplication operation on even-numbered term outputs of each of the first combination processing element and the second combination processing element.

In an embodiment, each of the first parallel processing element, the second parallel processing element, the third parallel processing element, and the fourth parallel processing element includes (S−2) stages (S being a natural number greater than 2). Each of the first combination processing element, the second combination processing element, the third combination processing element, and the fourth combination processing element includes one stage. Each of the stages included in the first parallel processing element, the second parallel processing element, the third parallel processing element, the fourth parallel processing element, the first combination processing element, the second combination processing element, the third combination processing element, and the fourth combination processing element has a Radix-R structure (R being a natural number). The N, the S, and the R satisfy an equation: $N=S^R$.

In an embodiment, the homomorphic encryption calculating accelerator further includes a data input/output unit that receives the plurality of input data from an external memory device and provides the plurality of output data to the external memory device, and a processor that controls the data input/output unit, the parallel processing unit, and the combination unit.

In an embodiment, each of the first parallel processing element, the second parallel processing element, the third parallel processing element, the fourth parallel processing element, the first combination processing element, the second combination processing element, the third combination processing element, and the fourth combination processing element is configured to operate using a plurality of twiddle factors.

In an embodiment, the processor recovers twiddle factors to be provided to the first parallel processing element, the second parallel processing element, the third parallel processing element, the fourth parallel processing element, the first combination processing element, and the second combination processing element, based on a modular multiplication operation on a simplified twiddle factor and a reference factor, and the processor further recovers twiddle factors to be provided to the third combination processing element and the fourth combination processing element, based on the modular multiplication operation on the simplified twiddle factor and an adjustment factor.

In an embodiment, the simplified twiddle factor is smaller in size than the twiddle factor.

According to an embodiment, an encryption system includes a communication device that communicates with an external device, an encryption device that generates encryption data by encrypting user data received from the communication device, a memory device that stores the encryption data, a homomorphic encryption calculating accelerator that generates computed encryption data by performing a homomorphic encryption operation on the encryption data, wherein the computed encryption data are stored in the memory device, and a decryption device that generates decryption data by decrypting the computed encryption data stored in the memory device. The homomorphic encryption calculating accelerator includes a parallel processing unit that performs a polynomial multiplication operation in parallel on a plurality of input data corresponding to a degree N polynomial of the encryption data, and a combination unit that generates a plurality of output data by performing the polynomial multiplication operation on an output of the parallel processing unit. The parallel processing unit includes a first parallel processing element that performs the polynomial multiplication operation on first input data among the plurality of input data, and a second parallel processing element that performs the polynomial multiplication operation on second input data among the plurality of input data. The first parallel processing element and the second parallel processing element are arranged in parallel, and each of the first parallel processing element and the second parallel processing element has a single-path delay feedback (SDF) number theoretic transform (NTT) hardware structure.

In an embodiment, the combination unit includes a first combination processing element that generates first output data and second output data by performing the polynomial multiplication operation on an output of the first parallel processing element and an output of the second parallel processing element.

In an embodiment, each of the first parallel processing element and the second parallel processing element includes (S−1) stages (S being a natural number greater than 1), the first combination processing element includes one stage, each of the stages included in the first parallel processing element, the second parallel processing element, and the first combination processing element has a Radix-R structure (R being a natural number), and the N, the S, and the R satisfy an equation: $N=S^R$.

In an embodiment, the parallel processing unit further includes a third parallel processing element that performs the polynomial multiplication operation on third input data among the plurality of input data, and a fourth parallel processing element that performs the polynomial multiplication operation on fourth input data among the plurality of input data. The first parallel processing element, the second parallel processing element, the third parallel processing element, and the fourth parallel processing element are arranged in parallel, and each of the third parallel processing element and the fourth parallel processing element has the SDF NTT hardware structure.

In an embodiment, the combination unit includes a first combination processing element that performs a polynomial operation on an output of the first parallel processing element and an output of the third parallel processing element, a second combination processing element that performs the polynomial operation on an output of the second parallel processing element and an output of the fourth parallel processing element, a third combination processing element that generates first output data and second output data by performing the polynomial multiplication operation on odd-numbered term outputs of each of the first combination processing element and the second combination processing element, and a fourth combination processing element that generates third output data and fourth output data by performing the polynomial multiplication operation on even-numbered term outputs of each of the first combination processing element and the second combination processing element.

BRIEF DESCRIPTION OF THE DRAWINGS

The above and other objects and features of the present disclosure will become apparent by describing in detail embodiments thereof with reference to the accompanying drawings.

FIG. 6 is a diagram illustrating a multi-stage structure included in a processing element of FIG. 3.

FIG. 10 is a block diagram illustrating a parallel processing unit of FIG. 9 in detail.

FIG. 11 is a block diagram illustrating a structure of a parallel computational accelerator of FIG. 2.

FIG. 12 is a block diagram illustrating a structure of a parallel computational accelerator of FIG. 2.

FIGS. 14A and 14B are diagrams for describing a structure of a twiddle factor used in a parallel computational accelerator of FIG. 13.

FIGS. 16A to 16C are diagrams for describing an operation of recovering an omitted twiddle factor based on a twiddle factor structure of FIG. 15.

DETAILED DESCRIPTION

Below, embodiments of the present disclosure will be described in detail and clearly to such an extent that one skilled in the art easily carries out the present disclosure.

Hereinafter, embodiments of the present disclosure will be described in detail with reference to accompanying drawings. In describing the present disclosure, to make the overall understanding easy, like components/elements will be marked by like reference signs/numerals in drawings, and thus, additional description will be omitted to avoid redundancy.

In the following drawings or in the detailed description, modules may be connected with any other components except for components illustrated in a drawing or described in the detailed description. Modules or components may be connected directly or indirectly. Modules or components may be connected through communication or may be physically connected.

Components that are described in the detailed description with reference to the terms "unit", "module", "layer", etc. will be implemented with software, hardware, or a combination thereof. For example, the software may be a machine code, firmware, an embedded code, or application software. For example, the hardware may include an electrical circuit, an electronic circuit, a processor, a computer, integrated circuit cores, a pressure sensor, an inertial sensor, a micro electro mechanical system (MEMS), a passive element, or a combination thereof.

Figure 1:
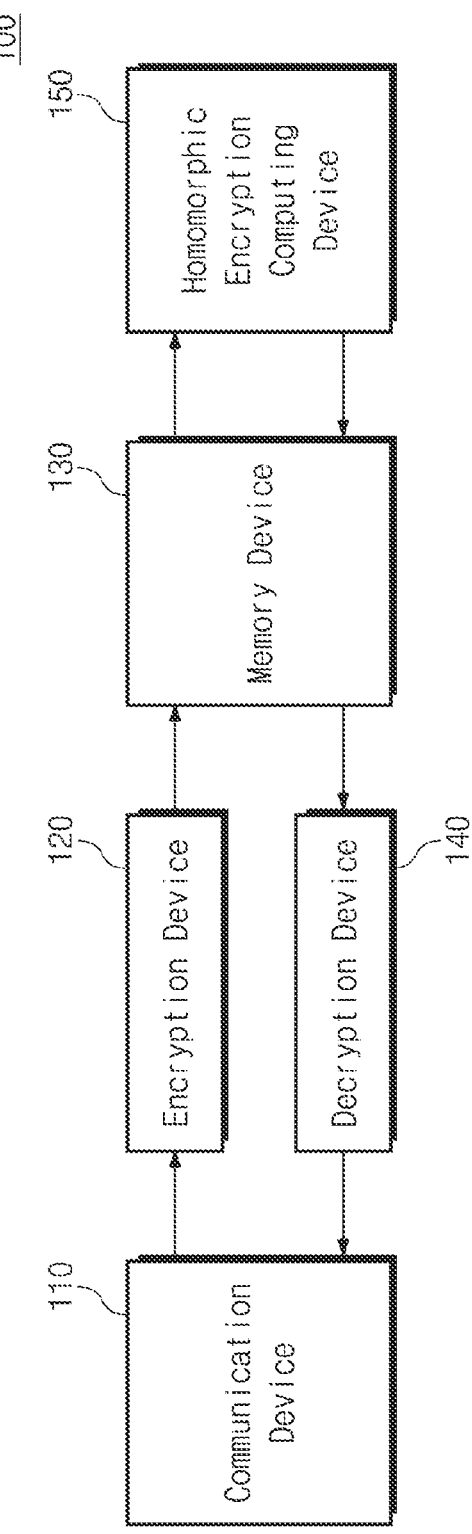
FIG. 1 is a block diagram illustrating an encryption system according to an embodiment of the present disclosure.

FIG. 1 is a block diagram illustrating an encryption system according to an embodiment of the present disclosure. Referring to FIG. 1, an encryption system 100 may include a communication device 110, an encryption device 120, a memory device 130, a decryption device 1400, and a homomorphic encryption computing device 150.

In an embodiment, the encryption system 100 may be an electronic device having a wired and/or wireless communication function or may be configured to be included in the electronic device. In an embodiment, the electronic device may be implemented with at least one of a smartphone, a tablet personal computer (PC), an image phone, an e-book reader, a desktop PC, a laptop PC, a netbook computer, a workstation, a server, a PDA, a portable multimedia player (PMP), an MP3 player, a camera, a wearable device, various kinds of medical devices (e.g., various kinds of portable medical measurement devices (e.g., a blood glucose monitoring device, a heartbeat measuring device, a blood pressure measuring device, and a body temperature measuring device), magnetic resonance angiography (MRA), magnetic resonance imaging (MRI), computed tomography (CT), a scanner, and an ultrasonic device), a navigation device, a global navigation satellite system (GNSS), an event data recorder (EDR), a flight data recorder (FDR), a vehicle infotainment device, electronic equipment for vessel (e.g., a navigation system for vessel and a gyrocompass for vessel), avionics, a security device, a head unit for vehicle, an industrial or home robot, a drone, an automatic teller's machine (ATM), a points of sale (POS), or an internet of things (e.g., a light bulb, various kinds of sensors, a sprinkler device, a fire alarm, a thermostat, a street lamp, and exercise equipment).

The communication device 110 may allow the encryption system 100 to communicate with the outside. For example, the communication device 110 may support the wired communication connection or wireless communication connection with an external device. The communication device 110 may be configured to receive original data (or raw data) from the external device or to provide the decrypted data to the external device.

In an embodiment, the description is given as the encryption system 100 of FIG. 1 communicates with the external device through the communication device 110, but the present disclosure is not limited thereto.

The encryption device 120 may generate the encryption data by performing encryption on the raw data received from the communication device 110. The encryption data may be stored in the memory device 130. The decryption device 1400 may generate the decrypted data (or original data) by performing decryption on the encryption data stored in the memory device 130. The decrypted data may be provided to the external device through the communication device 110.

In an embodiment, the encryption data stored in the memory device 130 may be homomorphic encryption data or a homomorphic ciphertext. For example, the encryption device 120 may generate the encryption data based on various homomorphic encryption technologies. The homomorphic encryption technology may include various schemes of encryption algorithms such as a BGV (Brakerski, Gentry, and Vaikuntanathan) algorithm, a BFV (Brakerski, Fan, and Vercauteren) algorithm, and a CKKS (Cheon, Kim, Kim and Song) algorithm. The encryption schemes encrypt a message (or data) into the homomorphic ciphertext in compliance with the R-LWE (Ring-Learning with Error) definition. The homomorphic ciphertext is generated through the following ciphertext generation process: 1) mapping the message to a degree N (i.e., higher-order) polynomial pair to generate a message polynomial, 2) adding an error value called an "error polynomial" to the message polynomial, and 3) including a secret key polynomial in the message polynomial. The BGV scheme, the BFV scheme, and the CKKS scheme are similar in that there is used a ciphertext expressed by a degree N (i.e., higher-order) polynomial but define different homomorphic operations. A bit position of bits indicating an error value added in the process of generating a homomorphic ciphertext is differently determined for each encryption scheme in a bit string constituting the homomorphic ciphertext. Due to the above characteristic, the BGV scheme, the BFV scheme, and the CKKS scheme define different homomorphic operations. The above homomorphic encryption algorithms are provided only as an example, and the present disclosure is not limited thereto.

As described above, the encryption data stored in the memory device 130 may be the homomorphic encryption data or the homomorphic ciphertext. In an embodiment, the result of computation between homomorphic ciphertexts has the same characteristic as the result of computation between original texts. That is, because there is no need to decrypt the ciphertext for the computation between ciphertexts, it is possible to process a ciphertext more quickly. In an embodiment, the computation between homomorphic ciphertexts or the homomorphic operation may include an encryption operation, a decryption operation, a homomorphic multiplication operation, a modular operation, a relinearization operation, a key switching operation, and a modulus switching operation.

The encryption operation and the decryption operation may be the homomorphic operations that are performed by a device such as a client. The homomorphic multiplication operation, the modular operation, the relinearization operation, the key switching operation, and the modulus switching operation may be the homomorphic operations that are performed by a device such as a cloud server.

The homomorphic encryption computing device 150 may be configured to perform the homomorphic encryption operation on the encryption data stored in the memory device 130. In an embodiment, as described above, the homomorphic ciphertext is expressed by a higher-order polynomial. In this case, the multiplication operation between higher-order polynomials is performed through computational hardware that is based on an NTT (number theoretic transform) algorithm. However, because the homomorphic ciphertext is a very higher-order polynomial, the hardware supporting the multiplication operation related to the homomorphic ciphertext is not yet practical.

The homomorphic encryption computing device 150 according to an embodiment of the present disclosure may include a parallel computational structure supporting the homomorphic encryption operation of the homomorphic ciphertext. A structure and an operation of the homomorphic encryption computing device 150 according to an embodiment of the present disclosure will be described in detail with reference to the following drawings.

Figure 2:
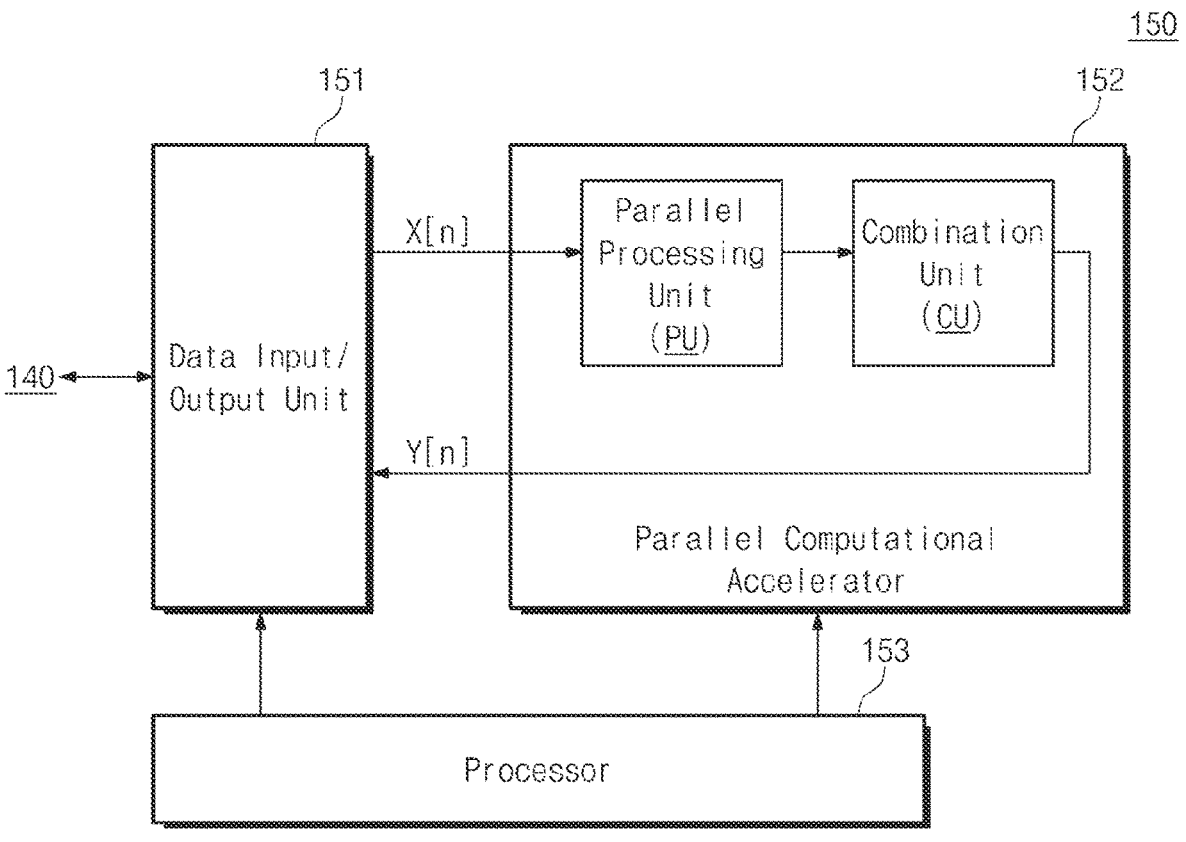
FIG. 2 is a block diagram illustrating a homomorphic encryption computing device of FIG. 1.

FIG. 2 is a block diagram illustrating a homomorphic encryption computing device of FIG. 1. Referring to FIGS. 1 and 2, the homomorphic encryption computing device 150 may include a data input/output unit 151, a parallel computational accelerator 152, and a processor 153.

The data input/output unit 151 may be configured to communicate with the memory device 130. For example, the data input/output unit 151 may receive the encryption data from the memory device 130 or may transmit the computed data (i.e., data experiencing homomorphic encryption) to the memory device 130. In an embodiment, the data input/output unit 151 may be variously implemented in structure depending on a kind of the memory device 130.

The parallel computational accelerator 152 may receive input data X[n] through the data input/output unit 151. In an embodiment, the input data X[n] may correspond to the homomorphic encryption data or the homomorphic ciphertext. The parallel computational accelerator 152 may perform the homomorphic encryption operation on the input data X[n] to generate output data Y[n]. In an embodiment, the output data Y[n] may correspond to the result of performing the homomorphic encryption operation on the input data X[n]. The output data Y[n] may be provided to the memory device 130 through the data input/output unit 151.

In an embodiment, the homomorphic encryption operation of the parallel computational accelerator 152 may be performed through processing circuits having a parallel structure. For example, the parallel computational accelerator 152 may include a parallel processing unit PU and a combination unit CU. The parallel processing unit PU may include a plurality of processing elements arranged in parallel. The combination unit CU may be configured to generate the output data Y[n] by combining the data output from the plurality of processing elements. A structure and an operation of the parallel computational accelerator 152 will be described in detail with reference to the following drawings.

Figure 3:
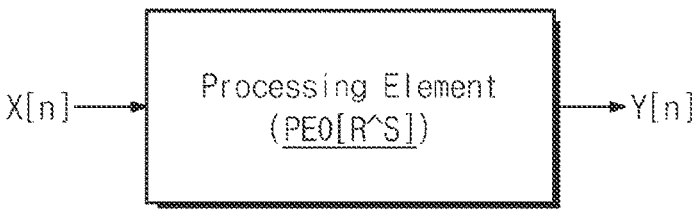
FIG. 3 is a diagram for describing a processing element used in a parallel computational accelerator of FIG. 2.

FIG. 3 is a diagram for describing a processing element used in a parallel computational accelerator of FIG. 2. Referring to FIGS. 2 and 3, each of the plurality of processing elements included in the parallel processing unit PU may have a structure illustrated in FIG. 3. For example, a 0-th processing element PE0[R^S] may include S stages, each of which may have a Radix-R structure. In this case, the 0-th processing element PE0[R^S] may be of an NTT hardware operator structure of a single-path delay feedback (SDF) scheme. In an embodiment, the 0-th processing element PE0[R^S] may perform the polynomial operation (or the multiplication operation) on the degree corresponding to a value of "R^S", In detail, when the radix "R" is 2 and the stage "S" is 8, the 0-th processing element PE0[R^S] may perform the homomorphic encryption operation on the degree 256 (=$2^8$) polynomial.

Figure 4:
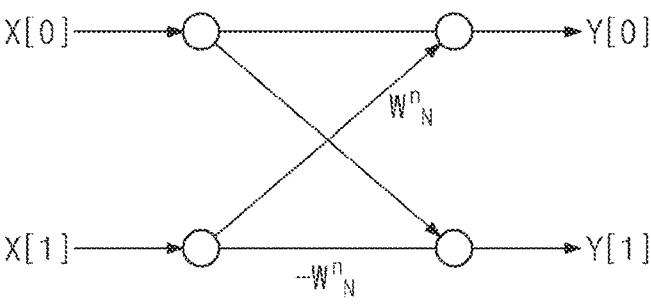
FIG. 4 is a diagram for describing one stage in a computational structure of a processing element of FIG. 3.
Figure 5:
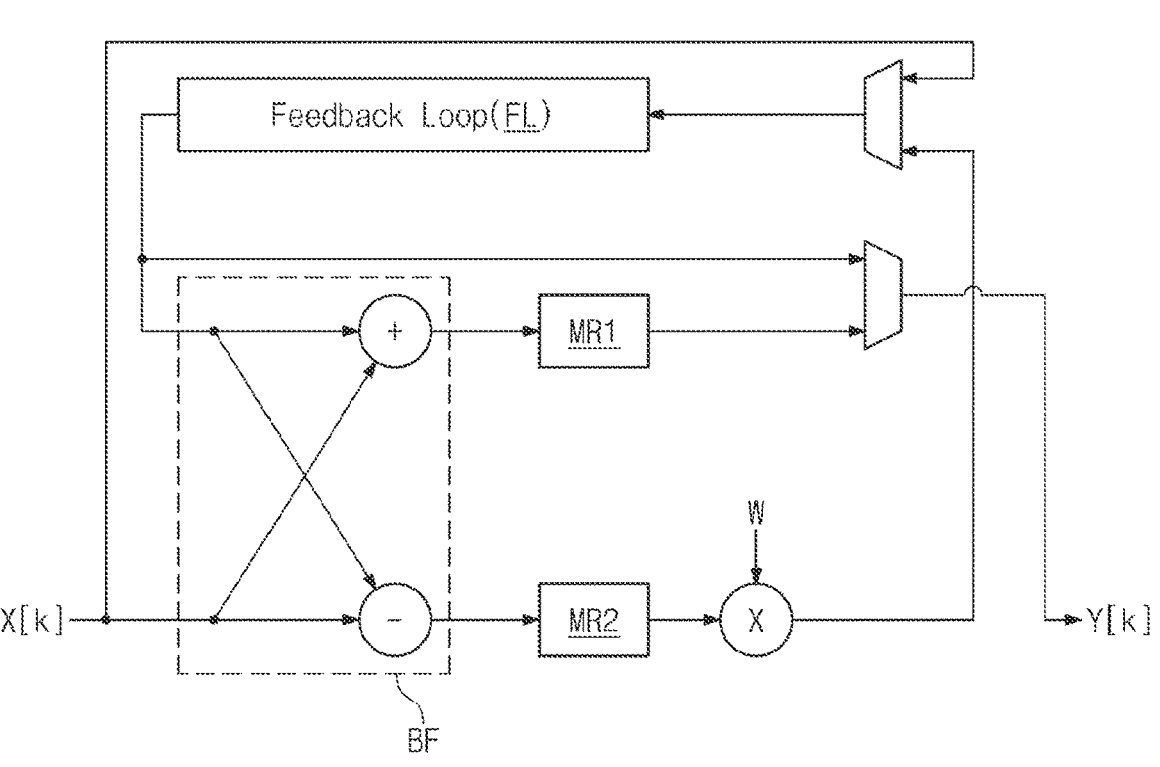
FIG. 5 illustrates a hardware structure implementing a single stage structure of FIG. 4.

FIG. 4 is a diagram for describing one stage in a computational structure of a processing element of FIG. 3. FIG. 5 illustrates a hardware structure implementing a single stage structure of FIG. 4. Referring to FIGS. 3 to 5, one stage included in the processing element PE0[R^S] may have a structure in which the radix is 2 and the stage is 1 (i.e., R=2 and S=1). In this case, the multiplication operation is performed on two input data X[0] and X[1], and thus, two output data Y[0] and Y[1] are output. In the structure illustrated in FIG. 4, the two output data Y[0] and Y[1] are expressed by Equation 1 below.

$$Y[0]=X[0]+W_N^n X[1]$$

$$Y[1]=X[0]-W_N^n X[1] \qquad \text{[Equation 1]}$$

In Equation 1 above, X[0] and X[1] represent input data; Y[0] and Y[1] represent output data; $-W_N^n - W_N^n$ and $W_N^n W_N^n$ represent weights between the input data and the output data.

In an embodiment, a computational structure or a computational algorithm of one stage STG illustrated in FIG. 4 may be implemented with a computational hardware structure of FIG. 5. For example, as illustrated in FIG. 5, one stage STG may include a butterfly computation unit BF, a first modular circuit MR1, a second modular circuit MR2, selectors, a feedback loop FL, and a weight circuit "X".

The butterfly computation unit BF may perform a butterfly operation on input data X[k] and feedback data. The output of the butterfly computation unit BF may be provided to the first modular circuit MR1 and the second modular circuit MR2. The first modular circuit MR1 may perform the modular operation on the output of the butterfly computation unit BF and may output the result of the modular operation. The second modular circuit MR2 may perform the modular operation on the output of the butterfly computation unit BF and may output the result of the modular operation. The output of the second modular circuit MR2 may be provided to the weight circuit "X". The weight circuit "X" may perform a weight operation "W" on the output of the second modular circuit MR2. The feedback loop FL may receive one of the output of the weight circuit "X" and the input data X[k] through the selector and may delay the received signal or data as much as a predetermined time. The signal output through the feedback loop FL may be provided as an input of the butterfly computation unit BF. In an embodiment, one of the output of the feedback loop FL and the output of the first modular circuit MR1 may be selected and output by the selector as an output signal Y[k].

In an embodiment, the computational structure of one stage STG illustrated in FIG. 4 may be implemented through the structure of one stage STG illustrated in FIG. 5. The structure of one stage STG illustrated in FIG. 5 is provided as an example of a part of the single-path delay feedback (SDF) structure. However, the present disclosure is not limited thereto.

Figure 6:
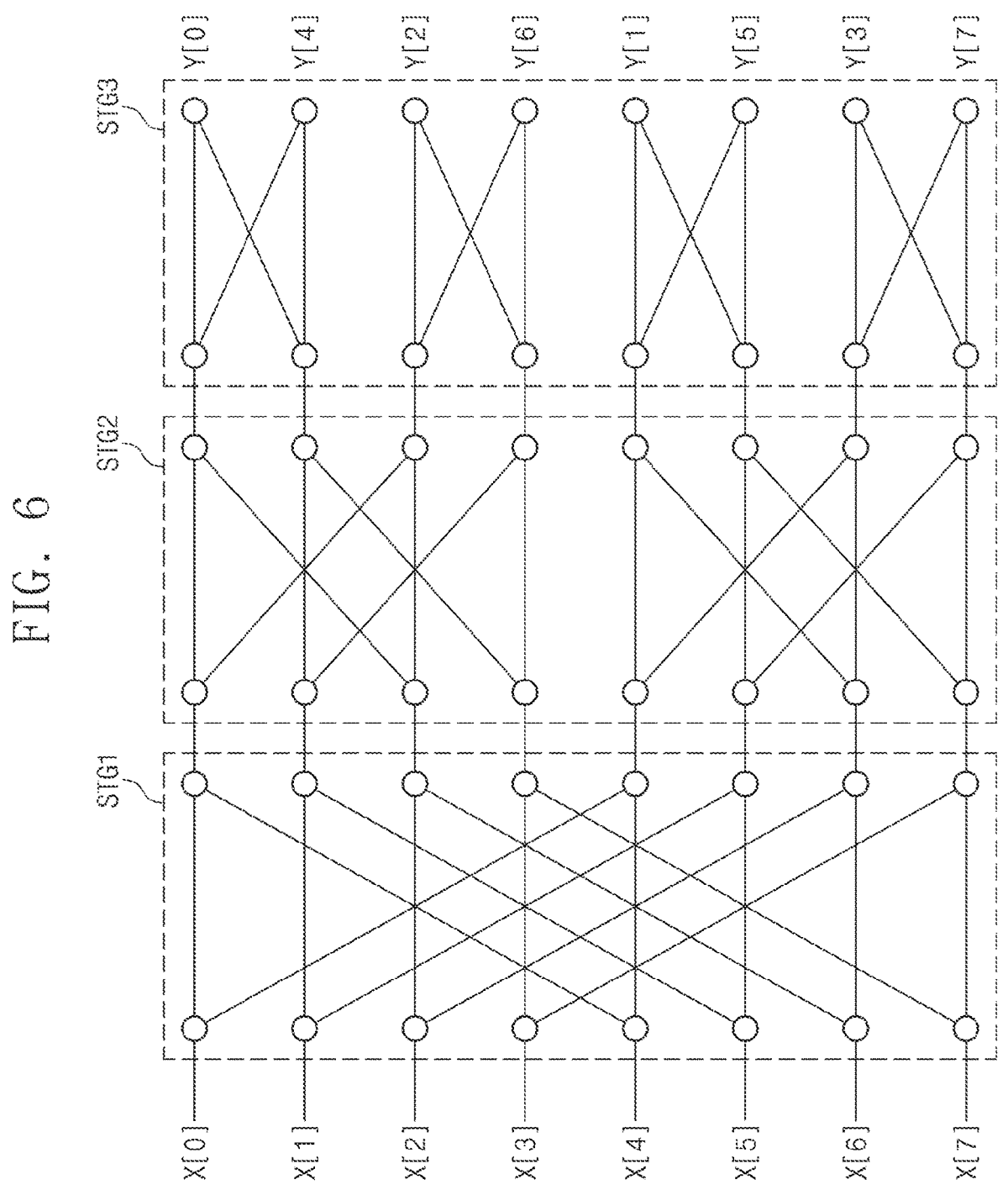

FIG. 6 is a diagram illustrating a multi-stage structure included in a processing element of FIG. 3. In an embodiment, the processing element illustrated in FIG. 6 may include first to third stages STG1, STG2, and STG3, and each of the first to third stages STG1, STG2, and STG3 may have the Radix-2 structure. In this case, the processing element illustrated in FIG. 6 may perform the operation (or the multiplication operation) on a degree 8 ($=2^3$) polynomial.

For example, as illustrated in FIG. 6, the first stage STG1 may receive 8 inputs X[0] to X[7] and may generate 8 outputs by performing the weight operation on the received 8 inputs X[0] to X[7]. The second stage STG2 may receive 8 outputs of the first stage STG1 as an input and may generate 8 outputs by performing the weight operation on the received 8 inputs. The third stage STG3 may receive 8 outputs of the second stage STG2 as an input and may generate 8 final outputs Y[0] to Y[7] by performing the weight operation on the received 8 inputs.

Figure 7:
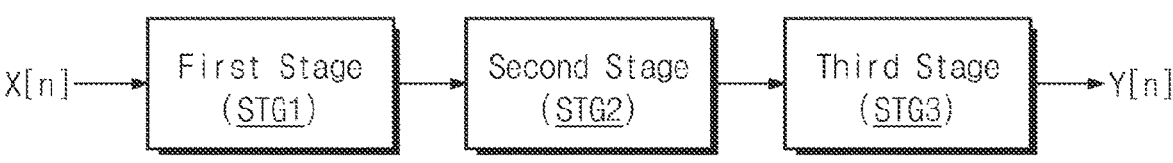
FIG. 7 is a block diagram illustrating a processing element of FIG. 6.

FIG. 7 is a block diagram illustrating a processing element of FIG. 6. In an embodiment, a 0-th processing element PE0[$2^3$] of FIG. 7 has a single-path delay feedback (SDF) number theoretic transform (NTT) hardware structure. The 0-th processing element PE0[$2^3$] may include the first to third stages STG1 to STG3, and each of the first to third stages STG1 to STG3 may have the Radix-2 structure. In this case, as described with reference to FIG. 6, the 0-th processing element PE0[$2^3$] may perform the operation on a degree 8 ($=2^3$) polynomial.

Figure 8:
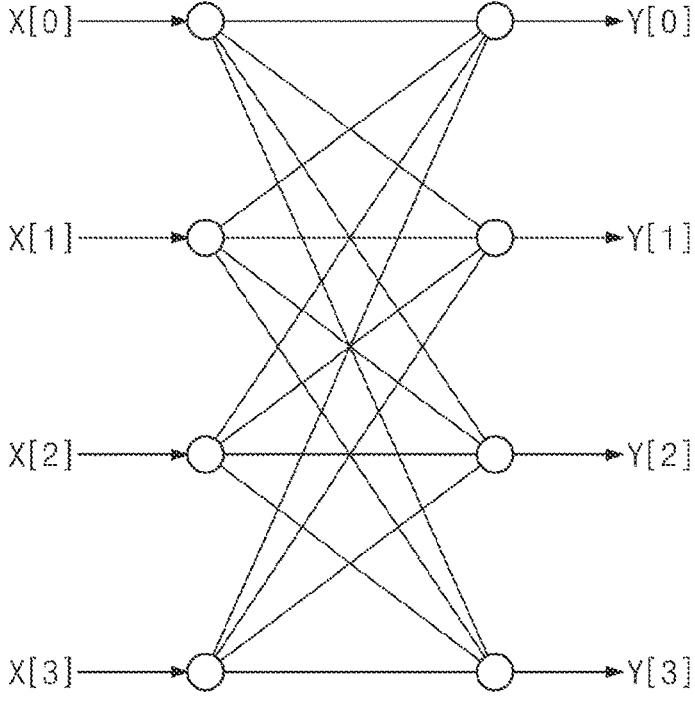
FIG. 8 is a diagram illustrating an example of a part of a structure of a processing element of FIG. 3.

FIG. 8 is a diagram illustrating an example of a part of a structure of a processing element of FIG. 3. In an embodiment, a processing element of FIG. 8 may include one stage, and the one stage may have the Radix-4 structure. In this case, the processing element may perform the polynomial multiplication operation on a degree 4 ($=4^1$) polynomial.

In an embodiment, it is assumed that the degree of an input polynomial is 65,536. In this case, when the processing element includes Radix-2 stages, the number of stages included in the processing element may be 16 (i.e., $R^S$=N, R=2, N=65,536, and S=16).

In contrast, when the processing element includes Radix-4 stages, the number of stages included in the processing element may be 8 (i.e., $R^S$=N, R=4, N=65,536, and S=8). In this case, with regard to the polynomial operation of the same degree, a computational speed of a processing element including 8 Radix-4 stages is two times faster than a computational speed of a processing element including 16 Radix-2 stages. However, the increase in the radix of each stage of a processing element makes the hardware complicated. That is, there is a limitation in improving a computational speed for a homomorphic ciphertext of a higher-order polynomial by using a single processing element.

Figure 9:
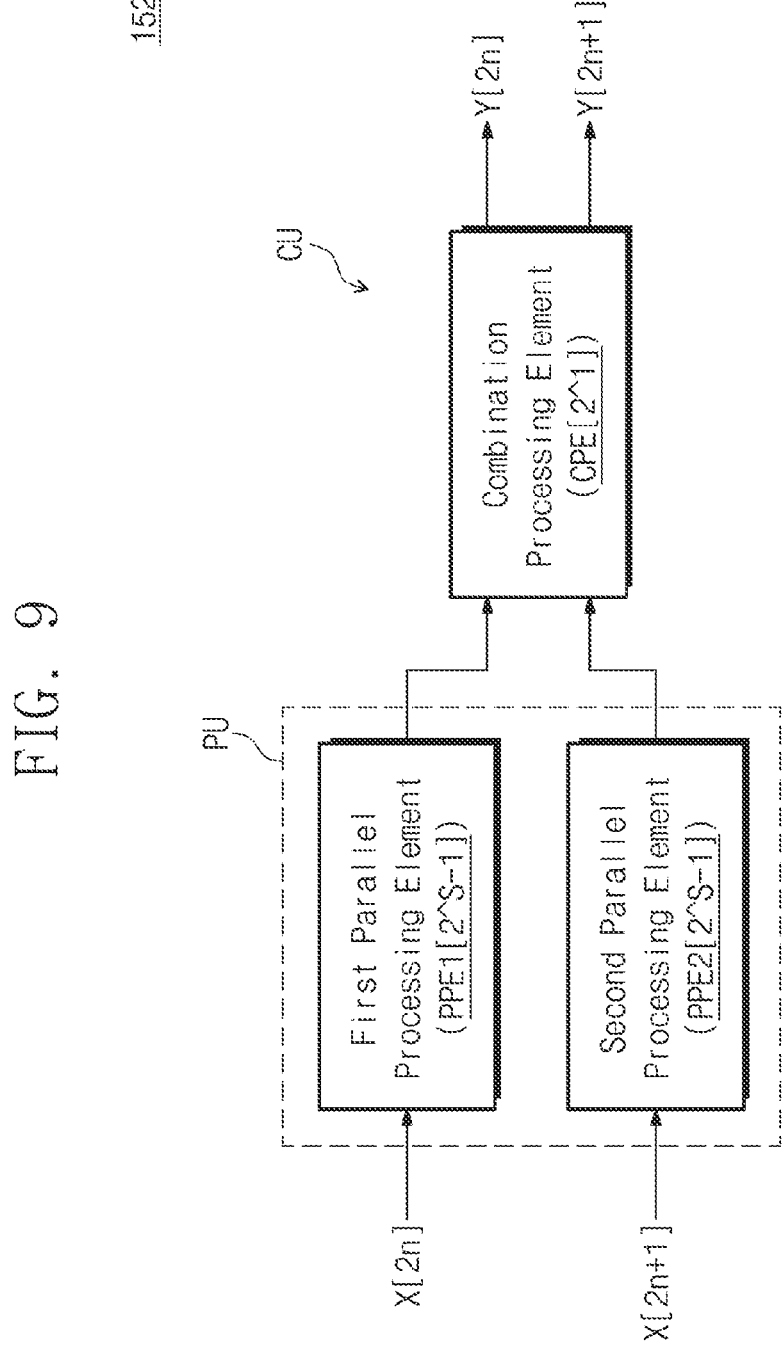
FIG. 9 is a block diagram illustrating a structure of a parallel computational accelerator of FIG. 2.

FIG. 9 is a block diagram illustrating a structure of a parallel computational accelerator of FIG. 2. Referring to FIGS. 2 and 9, the parallel computational accelerator 152 may include the parallel processing unit PU and the combination unit CU. The parallel processing unit PU may include a first parallel processing element PPE1[$2^S$−1] and a second parallel processing element PPE2[$2^S$−1]. The combination unit CU may include a combination processing element CPE[$2^1$]. In an embodiment, the first parallel processing element PPE1[$2^S$−1], the second parallel processing element PPE2[$2^S$−1], and the combination processing element CPE[$2^1$] may have the SDF NTT hardware structure. In an embodiment, each of the first parallel processing element PPE1[$2^S$−1], the second parallel processing element PPE2[$2^S$−1], and the combination processing element CPE[$2^1$] may have a structure similar to that of the processing element described with reference to FIGS. 4 to 6, but the number of stages may be differently determined for each processing element.

In an embodiment, the parallel computational accelerator 152 may perform the operation (or the multiplication or weight operation) on a degree N polynomial. For example, the first parallel processing element PPE1[$2^S$−1] may receive first inputs X[$2n$] among inputs of the degree N polynomial and may perform the operation (or the multiplication or weight operation) on the received inputs X[$2n$]. The second parallel processing element PPE2[$2^S$−1] may receive first inputs X[$2n$+1] among the inputs of the degree N polynomial and may perform the operation (or the multiplication or weight operation) on the received inputs X[$2n$+1]. The output of each of the first parallel processing element PPE1[$2^S$−1] and the second parallel processing element PPE2[$2^S$−1] may be provided to the combination processing element CPE[$2^1$]. The combination processing element CPE[$2^1$] may perform the operation on the received inputs to output final outputs Y[$2n$] and Y[$2n$+1].

In an embodiment, it is assumed that the degree of an input polynomial is 65,536. In this case, in the case of performing the operation by using a single processing element including Radix-2 stages, 16 stages are required (i.e., R=2 and S=16).

In contrast, in the parallel computational accelerator 152 of FIG. 9, the first parallel processing element PPE1[$2^S$−1] and the second parallel processing element PPE2[$2^S$−1] are arranged in parallel. In this case, the number of stages of each of two parallel processing elements (i.e., PPE1[$2^S$−1] and PPE2[$2^S$−1]) is determined to satisfy Equation 2 below.

$$S_P = S_{N,R} - P/2 \qquad \text{[Equation 2]}$$

In Equation 2 above, $S_P$ represents the number of stages included in one parallel processing element, P represents the number of processing elements arranged in parallel, and $S_{N,R}$ represents the number of Radix-R stages necessary for computation of a degree N polynomial. For example, when the degree of a polynomial may be 65,536 and each stage is implemented with the Radix-2 structure, $S_{N,R}$ may be 16. In this case, according to the embodiment of FIG. 9, because P (i.e., the number of processing elements arranged in parallel) is 2, the number of stages of each of two parallel processing elements (i.e., PPE1[$2^S$−1] and PPE2[$2^S$−1]) may be 15.

In the above structure, a computational speed may be improved as much as "P×(R/a)", in which P represents the number of processing elements arranged in parallel, R represents Radix-R of a stage included in a processing element, and "a" represents Radix-a of a stage included in a processing element used as a reference of a computational speed.

For example, compared to a single processing element including Radix-2 stages, the computational speed of the parallel computational accelerator 152 illustrated in FIG. 9 may be improved as much as "P×(R/a)", that is, as much as two times ($=2×(2/2)$).

Figure 10:
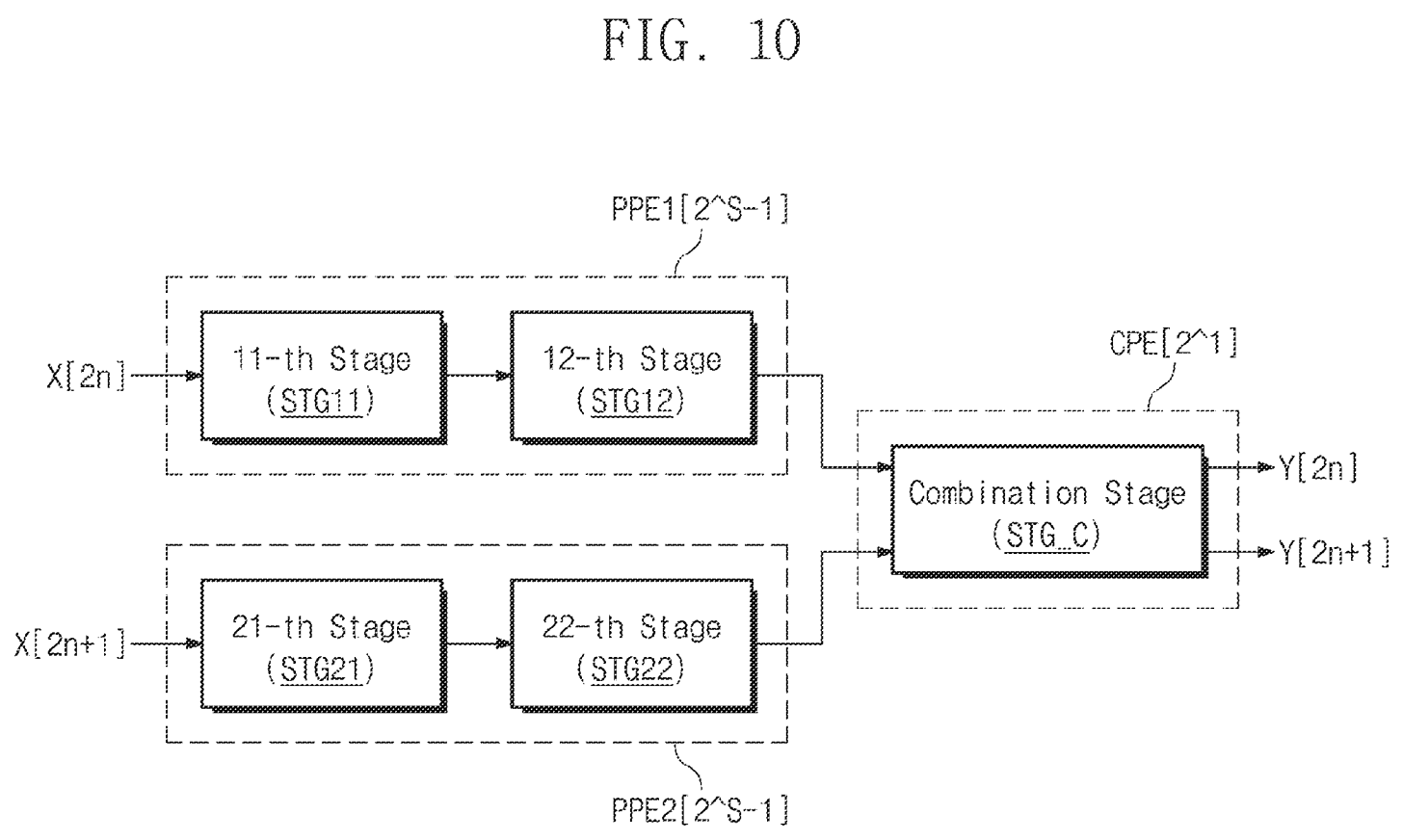

FIG. 10 is a block diagram illustrating a parallel processing unit of FIG. 9 in detail. For convenience of description, additional description associated with the components described above will be omitted to avoid redundancy. In an embodiment, it is assumed that the degree of an input polynomial is 8. However, the present disclosure is not limited thereto.

Referring to FIGS. 9 and 10, the first parallel processing element PPE1[$2^S$−1] may receive first inputs X[$2n$] among inputs of a degree 8 polynomial and may perform the operation (or the multiplication or weight operation) on the received inputs X[2$n$]. The second parallel processing element PPE2[2^S−1] may receive second inputs X[2$n$+1] among the inputs of the degree 8 polynomial and may perform the operation (or the multiplication or weight operation) on the received inputs X[2$n$+1].

For example, when the degree of an input polynomial is 8 and each processing element has a Radix-2 structure, each of the first parallel processing element PPE1[2^S−1] and the second parallel processing element PPE2[2^S−1] may include 2 stages as described with reference to FIG. 9. In detail, the first parallel processing element PPE1[2^S−1] may include a 11-th stage STG11 and a 12-th stage STG12, and the second parallel processing element PPE2[2^S−1] may include a 21-th stage STG21 and a 22-th stage STG22. In an embodiment, each of the 11-th stage STG11, the 12-th stage STG12, the 21-th stage STG21, and the 22-th stage STG22 may have the structure illustrated in FIG. 5 or the SDF NTT hardware structure.

The combination processing element CPE[2^1] may receive the outputs of the first parallel processing element PPE1[2^S−1] and the second parallel processing element PPE2[2^S−1] and may output final outputs Y[2$n$] and Y[2$n$+1] by performing the operation on the received inputs. For example, the combination processing element CPE[2^1] may include a combination stage STG_C. The combination stage STG_C may have the SDF NTT hardware structure.

FIG. 11 is a block diagram illustrating a structure of a parallel computational accelerator of FIG. 2. Referring to FIGS. 2 and 11, a parallel computational accelerator 152-1 may include a parallel processing unit PU-1 and a combination unit CU-1. The parallel processing unit PU-1 may include a first parallel processing element PPE1[4^S−1] and a second parallel processing element PPE2[4^S−1]. The combination unit CU-1 may include a combination processing element CPE[4^1].

The first parallel processing element PPE1[4^S−1] may receive first inputs X[4$n$] among inputs of a degree N polynomial and may perform the operation (or the multiplication or weight operation) on the received inputs X[4$n$]. The second parallel processing element PPE2[4^S−1] may receive second inputs X[4$n$+1] among the inputs of the degree N polynomial and may perform the operation (or the multiplication or weight operation) on the received inputs X[4$n$+1]. The outputs of the first parallel processing element PPE1[4^S−1] and the second parallel processing element PPE2[4^S−1] are provided to the combination processing element CPE[4^1]. The combination processing element CPE[4^1] may output final outputs Y[4$n$] and Y[4$n$+1] by performing the operation on the outputs of the first parallel processing element PPE1[4^S−1] and the second parallel processing element PPE2[4^S−1].

In the embodiment of FIG. 9, each of the processing elements PPE1[2^S−1], PPE2[2^S−1], and CPE[2^1] include a stage with the Radix-2 structure. In contrast, in the embodiment of FIG. 11, each of the processing elements PPE1[4^S−1], PPE2[4^S−1], and CPE[4^1] include a stage with the Radix-4 structure. In this case, a computational speed of the parallel computational accelerator 152-1 may be further improved. For example, compared to a single processing element including Radix-2 stages, the computational speed of the parallel computational accelerator 152 according to the embodiment of FIG. 9 may be improved as much as "P×(R/a)", that is, as much as two times (=2×(2/2)). In contrast, compared to a single processing element including Radix-2 stages, the computational speed of the parallel computational accelerator 152-1 according to the embodiment of FIG. 11 may be improved as much as "P×(R/a)", that is, as much as four times (=2×(4/2)).

Figure 12:
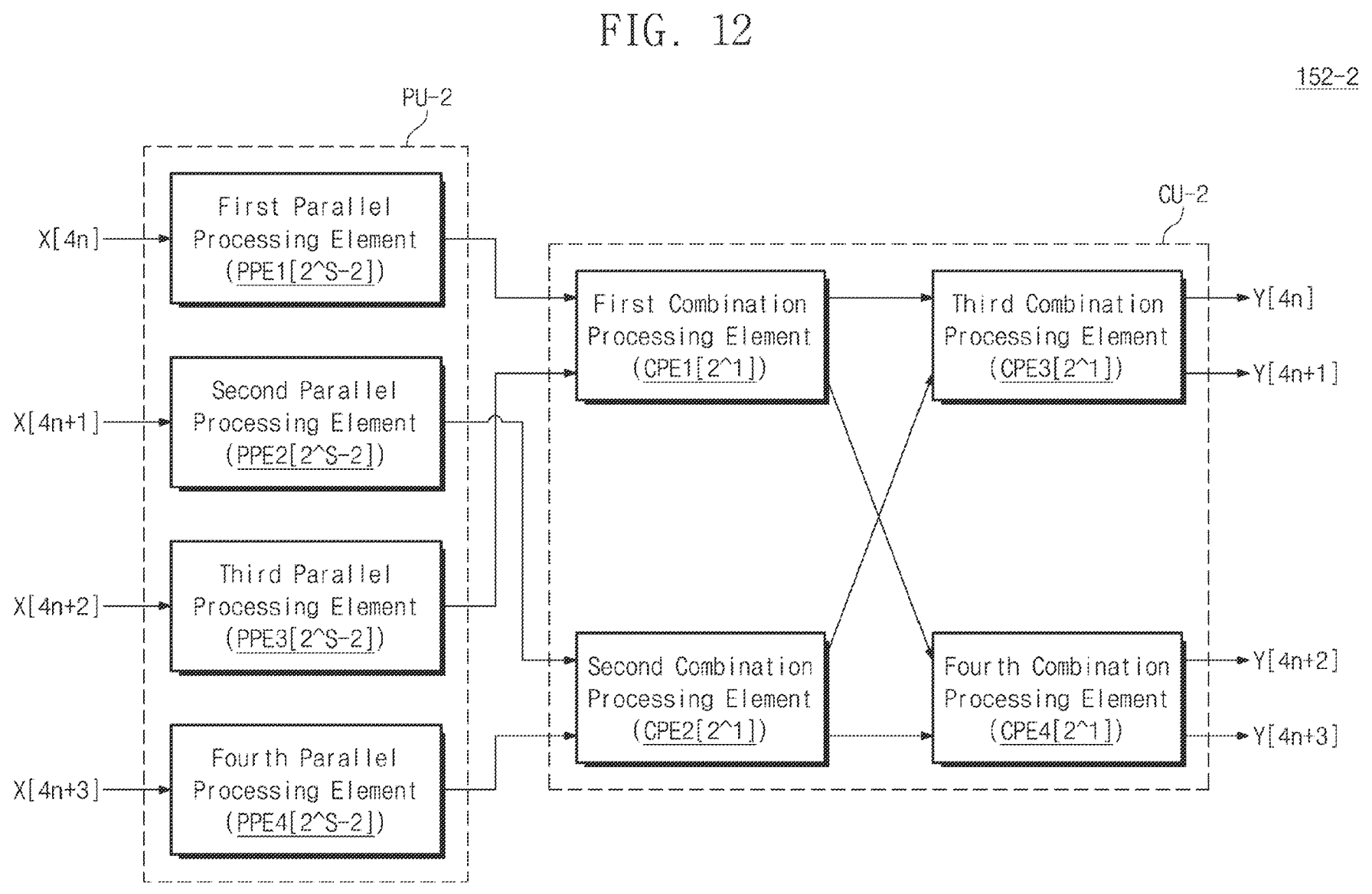

FIG. 12 is a block diagram illustrating a structure of a parallel computational accelerator of FIG. 2. Referring to FIG. 12, a parallel computational accelerator 152-2 may include a parallel processing unit PU-2 and a combination unit CU-2.

The parallel processing unit PU-2 may include a first parallel processing element PPE1[2^S−2], a second parallel processing element PPE2[2^S−2], a third parallel processing element PPE3[2^S−2], and a fourth parallel processing element PPE4[2^S−2]. The first parallel processing element PPE1[2^S−2] may receive first inputs X[4$n$] among inputs of a degree N polynomial and may perform the operation on the first inputs X[4$n$] thus received. The second parallel processing element PPE2[2^S−2] may receive second inputs X[4$n$+1] among the inputs of the degree N polynomial and may perform the operation on the second inputs X[4$n$+1] thus received. The third parallel processing element PPE3[2^S−2] may receive third inputs X[4$n$+2] among the inputs of the degree N polynomial and may perform the operation on the third inputs X[4$n$+2] thus received. The fourth parallel processing element PPE4[2^S−2] may receive fourth inputs X[4$n$+3] among the inputs of the degree N polynomial and may perform the operation on the fourth inputs X[4$n$+3] thus received. Each of the first parallel processing element PPE1[2^S−2], the second parallel processing element PPE2[2^S−2], the third parallel processing element PPE3[2^S−2], and the fourth parallel processing element PPE4[2^S−2] may have the SDF NTT-based hardware structure.

The combination unit CU-2 may include a first combination processing element CPE1[2^S1], a second combination processing element CPE2[2^S1], a third combination processing element CPE3[2^S1], and a fourth combination processing element CPE4 [2^S1].

The first combination processing element CPE1[2^S1] may receive the outputs of the first parallel processing element PPE1[2^S−2] and the third parallel processing element PPE3[2^S−2] as an input and may perform the operation on the received inputs. The second combination processing element CPE2[2^1] may receive the outputs of the second parallel processing element PPE2[2^S−2] and the fourth parallel processing element PPE4[2^S−2] as an input and may perform the operation on the received inputs.

The third combination processing element CPE3[2^1] may receive odd-numbered term outputs among output terms of the first combination processing element CPE1 [2^S1] and the second combination processing element CPE2[2^S1] as an input and may output final outputs Y[4$n$] and Y[4$n$+1] by performing the operation on the received inputs. The fourth combination processing element CPE4 [2^1] may receive even-numbered term outputs among output terms of the first combination processing element CPE1 [2^S1] and the second combination processing element CPE2[2^S1] as an input and may output final outputs Y[4$n$+2] and Y[4$n$+3] by performing the operation on the received inputs.

In an embodiment, in the parallel computational accelerator 152-2 illustrated in FIG. 12, the number of processing elements connected in parallel is 4. Accordingly, as described with reference to Equation 2 above, the operating speed of the parallel computational accelerator 152-2 illustrated in FIG. 12 may be four times the operating speed of the single processing element.

As described above, according to an embodiment of the present disclosure, as processing elements with the SDF NTT hardware structure are arranged in parallel, a speed with which the homomorphic ciphertext is computed may be improved without an increase of hardware complexity.

In the above embodiments, the description is mainly given based on the configuration in which each stage STG has the Radix-2 structure, but the present disclosure is not limited thereto. For example, each stage STG may be implemented to have various structures such as Radix-2, Radix-4, Radix-8, and Radix-16 structures.

Figure 13:
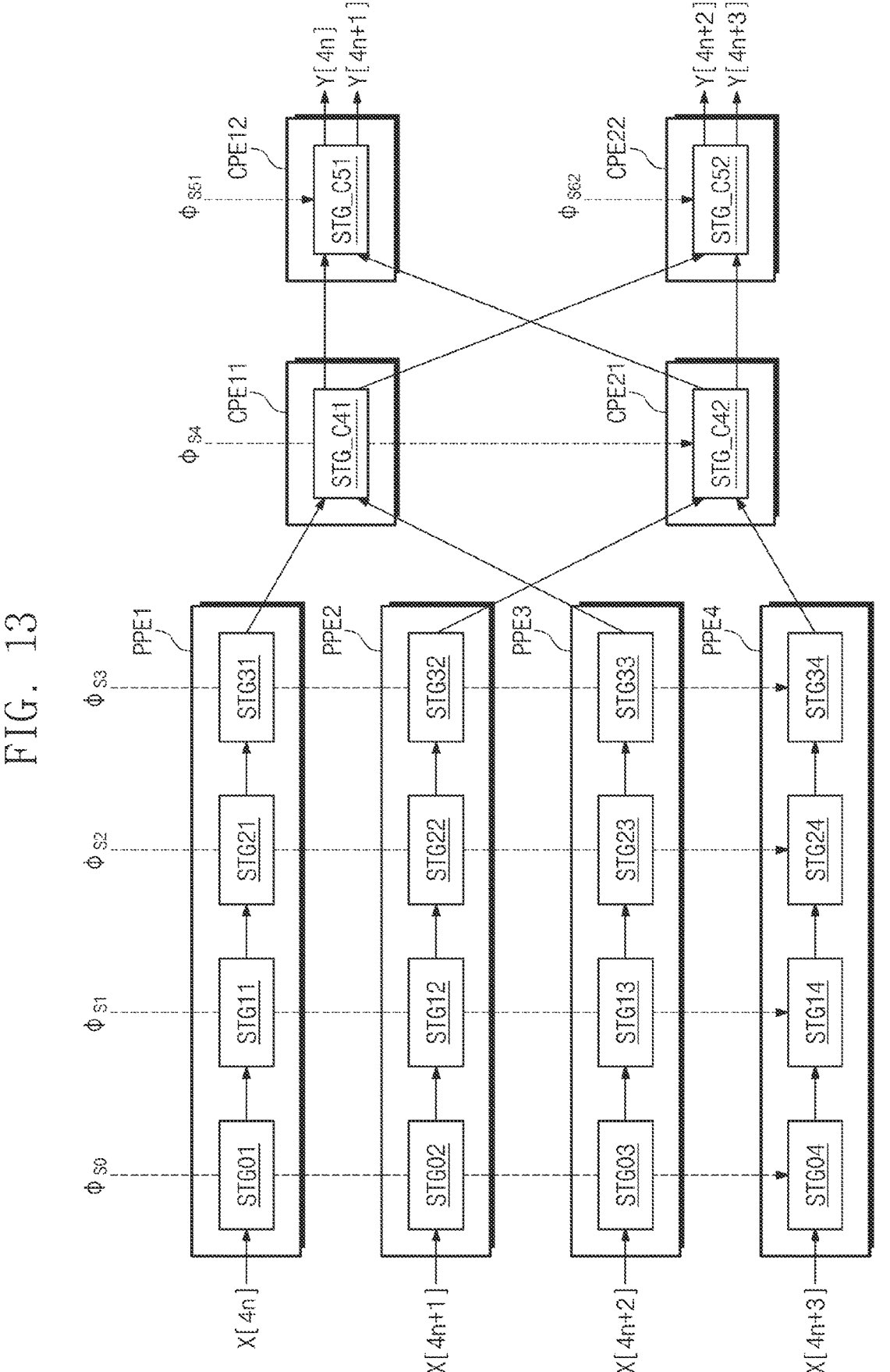
FIG. 13 is a diagram for describing an operation of a parallel computational accelerator of FIG. 12.

FIG. 13 is a diagram for describing an operation of a parallel computational accelerator of FIG. 12. For convenience of description, additional description associated with the components described above will be omitted to avoid redundancy. Referring to FIG. 13, a parallel computational accelerator may include a first parallel processing element PPE1, a second parallel processing element PPE2, a third parallel processing element PPE3, a fourth parallel processing element PPE4, and a plurality of combination processing elements CPE11, CPE12, CPE21, and CPE22.

The first parallel processing element PPE1, the second parallel processing element PPE2, the third parallel processing element PPE3, and the fourth parallel processing element PPE4 may respectively receive input data X[4$n$], X[4$n$+1], X[4$n$+2], and X[4$n$+3] and may perform the operation on the received data. That is, as in the above description, the first parallel processing element PPE1, the second parallel processing element PPE2, the third parallel processing element PPE3, and the fourth parallel processing element PPE4 may process the input data X[4$n$], X[4$n$+1], X[4$n$+2], and X[4$n$+3] in parallel.

The plurality of combination processing elements CPE11, CPE12, CPE21, and CPE22 may generate final outputs Y[4$n$], Y[4$n$+1], Y[4$n$+2], and Y[4$n$+3] by performing the operation on the outputs of the first parallel processing element PPE1, the second parallel processing element PPE2, the third parallel processing element PPE3, and the fourth parallel processing element PPE4.

In an embodiment, each of the first parallel processing element PPE1, the second parallel processing element PPE2, the third parallel processing element PPE3, the fourth parallel processing element PPE4, and the plurality of combination processing elements CPE11, CPE12, CPE21, and CPE22 may have the SDF NTT hardware structure. In an embodiment, in the SDF NTT hardware structure, the operation may be performed in a state where a coefficient input value (i.e., input data) and a twiddle factor of a polynomial to be applied for each stage is prepared.

For example, the first parallel processing element PPE1 may include 01-th to 31-th stages STG01 to STG31, the second parallel processing element PPE2 may include 02-th to 32-th stages STG02 to STG32, the third parallel processing element PPE3 may include 03-th to 33-th stages STG03 to STG33, and the fourth parallel processing element PPE4 may include 04-th to 34-th stages STG04 to STG34. The combination processing elements CPE11, CPE12, CPE21, and CPE22 may respectively include combination stages STG_C41, STG_C51, STGC42, and STG_C52.

In this case, each of the 01-th, 02-th, 03-th, and 04-th stages STG01, STG02, STG03, and STG04 may perform the operation by using a 0-th twiddle factor $\varphi_{S0}$. Each of the 11-th, 12-th, 13-th, and 14-th stages STG11, STG12, STG13, and STG14 may perform the operation by using a first twiddle factor $\varphi_{S1}$. Each of the 21-th, 22-th, 23-th, and 24-th stages STG21, STG22, STG23, and STG24 may perform the operation by using a second twiddle factor $\varphi_{S2}$. Each of the 31-th, 32-th, 33-th, and 34-th stages STG31, STG32, STG33, and STG34 may perform the operation by using a third twiddle factor $\varphi_{S3}$.

Each of the 41-th combination stage STG_C41 and 42-th combination stage STG_C42 may perform the operation by using a fourth twiddle factor $\varphi_{S4}$. The 51-th combination stage STG_C51 may perform the operation by using a 51-th twiddle factor $\varphi_{S51}$. The 52-th combination stage STG_C52 may perform the operation by using a 52-th twiddle factor $\varphi_{S62}$.

In an embodiment, each of the twiddle factors $\varphi_{S0}$, $\varphi_{S1}$, $\varphi_{S2}$, $\varphi_{S3}$, $\varphi_{S4}$, $\varphi_{S51}$, and $\varphi_{S52}$ has a value determined in advance for each stage and is stored in a separate memory or register. In this case, the size of the memory or register that is used to store the plurality of twiddle factors and $\varphi_{S0}$, $\varphi_{S1}$, $\varphi_{S2}$, $\varphi_{S3}$, $\varphi_{S4}$, $\varphi_{S51}$, and $\varphi_{S52}$ may become larger.

According to an embodiment of the present disclosure, it may be possible to decrease the size of the memory or register used to store the plurality of twiddle factors $\varphi_{S0}$, $\varphi_{S1}$, $\varphi_{S2}$, $\varphi_{S3}$, $\varphi_{S4}$, $\varphi_{S51}$, and $\varphi_{S52}$ by changing the structure for the plurality of twiddle factors $\varphi_{S0}$, $\varphi_{S1}$, $\varphi_{S2}$, $\varphi_{S3}$, $\varphi_{S4}$, $\varphi_{S51}$, and $\varphi_{S52}$. A structure of a twiddle factor according to an embodiment of the disclosure concept will be described in detail with reference to the following drawings.

FIGS. 14A and 14B are diagrams for describing a structure of a twiddle factor used in a parallel computational accelerator of FIG. 13. For convenience of description, a part of a structure of a twiddle factor according to an embodiment of the present disclosure will be described as an example, but the present disclosure is not limited thereto.

Referring to FIG. 14A, first, 64 natural numbers 0 to 63 are naturally sorted to generate a structure of a twiddle factor that is used in the structure of the parallel computational accelerator 152-3 of FIG. 13 (i.e., in the structure where 4 processing elements are connected in parallel, in the case of a computational structure for a degree 64 polynomial). Bit-reversal conversion may be performed on the naturally sorted natural numbers 0 to 63 such that bit-reversal sorting is made. In this case, as illustrated in FIG. 14A, natural numbers may be sorted in the order of 0, 32, 16, . . . , 30, 62, 1, 33, . . . , 63.

In the case of sequentially classifying the remaining natural numbers other than "0" with regard to the natural numbers whose bit order is reversely sorted, as illustrated in FIG. 14B, the plurality of twiddle factors $\varphi_{S0}$, $\varphi_{S1}$, $\varphi_{S2}$, $\varphi_{S3}$, $\varphi_{S4}$, $\varphi_{S51}$, and $\varphi_{S52}$ may be determined. The plurality of twiddle factors $\varphi_{S0}$, $\varphi_{S1}$, $\varphi_{S2}$, $\varphi_{S3}$, $\varphi_{S4}$, $\varphi_{S51}$, and $\varphi_{S52}$ may be provided to the corresponding stages as described with reference to FIG. 13.

In an embodiment, because the values of the plurality of twiddle factors $\varphi_{S0}$, $\varphi_{S1}$, $\varphi_{S2}$, $\varphi_{S3}$, $\varphi_{S4}$, $\varphi_{S51}$, and $\varphi_{S52}$ are determined in advance, the values are stored in a separate memory or register. In the embodiment of FIG. 14B, a memory space corresponding to a total of 64 words is required to store the plurality of twiddle factors $\varphi_{S0}$, $\varphi_{S1}$, $\varphi_{S2}$, $\varphi_{S3}$, $\varphi_{S4}$, $\varphi_{S51}$, and $\varphi_{S52}$.

Figure 15:
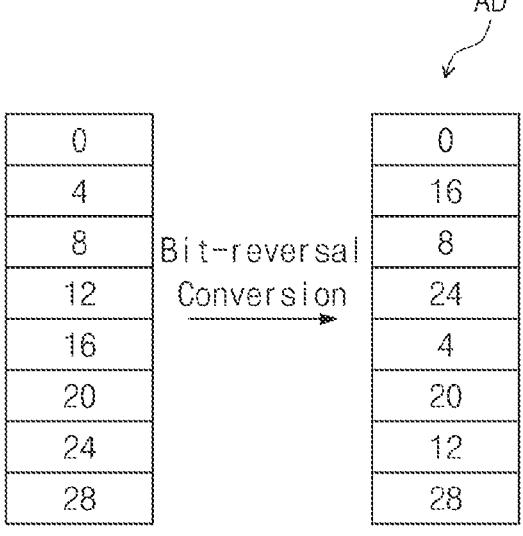
FIG. 15 is a diagram illustrating a structure of a twiddle factor according to an embodiment of the present disclosure.

FIG. 15 is a diagram illustrating a structure of a twiddle factor according to an embodiment of the present disclosure. Referring to FIG. 15, a plurality of simplified twiddle factors $\varphi_{S0}$, $\varphi_{S1}$, $\varphi_{S2}$, $\varphi_{S3}$, $\varphi_{S4}$, $\varphi_{S51}$, and $\varphi_{S52}$ have magnitudes smaller than those of the plurality of twiddle factors $\varphi_{S0}$, $\varphi_{S1}$, $\varphi_{S2}$, $\varphi_{S3}$, $\varphi_{S4}$, $\varphi_{S51}$, and $\varphi_{S52}$ of FIG. 14. For example, in the embodiment of FIG. 14B, the first twiddle factor $\varphi_{S1}$ includes 2 factors, that is, 16 and 48. In contrast, in the embodiment of FIG. 15, the first simplified twiddle factor $\varphi_{S1}$ includes only one factor, that is, 16. Also, in the embodiment of FIG. 14B, the second twiddle factor $\varphi_{S2}$ includes 4 factors, that is, 8, 40, 24, and 56. In contrast, in the embodiment of FIG. 15, the second simplified twiddle factor $\varphi_{S2}$ includes only 2 factors, that is, 8 and 24. Likewise, factors included in each of the plurality of simplified twiddle factors $\varphi_{S0}$, $\varphi_{S1}$, $\varphi_{S2}$, $\varphi_{S3}$, $\varphi_{S4}$, $\varphi_{S51}$, and $\varphi_{S52}$ are smaller in number than those included in each of the plurality of twiddle factors $\varphi_{S0}$, $\varphi_{S1}$, $\varphi_{S2}$, $\varphi_{S3}$, $\varphi_{S4}$, $\varphi_{S51}$, and $\varphi_{S52}$ of FIG. 14B.

In an embodiment, for the normal operation of the parallel computational accelerator 152-3 of FIG. 13, the whole structure of the plurality of twiddle factors $\varphi_{S0}$, $\varphi_{S1}$, $\varphi_{S2}$, $\varphi_{S3}$, and $\varphi_{S4}$, $\varphi_{S51}$, and $\varphi_{S52}$ illustrated in FIG. 14B, that is, the structure of the plurality of twiddle factors $\varphi_{S0}$, $\varphi_{S1}$, $\varphi_{S2}$, $\varphi_{S3}$, $\varphi_{S4}$, $\varphi_{S51}$, and $\varphi_{S52}$ not simplified are required. Accordingly, there is a need to recover the plurality of twiddle factors $\varphi_{S0}$, $\varphi_{S1}$, $\varphi_{S2}$, $\varphi_{S3}$, and $\varphi_{S4}$, $\varphi_{S51}$, and $\varphi_{S52}$ of FIG. 14B based on the plurality of simplified twiddle factors $\varphi_{S0}$, $\varphi_{S1}$, $\varphi_{S2}$, $\varphi_{S3}$, and $\varphi_{S4}$, $\varphi_{S51}$, and $\varphi_{S52}$ of FIG. 15.

In this case, omitted twiddle factors may be recovered or obtained through the modular multiplication operation on some twiddle factors (e.g., $\varphi_{S1}$, $\varphi_{S2}$, $\varphi_{S3}$, and $\varphi_{S4}$) simplified in FIG. 15 and a reference factor. Alternatively, omitted twiddle factors may be recovered or obtained through the modular multiplication operation on some twiddle factors (e.g., $\varphi_{S51}$ and $\varphi_{S52}$) simplified in FIG. 15 and adjustment factors AD. In an embodiment, the adjustment factor AD may be determined by performing the bit-reversal conversion on numbers arranged according to a given rule. In the embodiment of FIG. 15, numbers arranged according to the given rule may be 0, 4, 8, 12, 16, 20, 24, and 28, and numbers of the adjustment factor AD obtained through the bit-reversal conversion may be 0, 16, 8, 24, 4, 20, 12, and 28. However, the present disclosure is not limited thereto. A twiddle factor structure, a reference factor, and an adjustment factor may be variously changed and modified depending on the structure of the parallel computational accelerator 152-3.

In the embodiment of FIG. 14B, a memory space corresponding to 64 words is required to store a twiddle factor. In contrast, in the embodiment of FIG. 15, a memory space corresponding to 20 (=1+1+2+4+8+2+2) words is required to store a simplified twiddle factor. In an embodiment, a memory space corresponding to 8 words is required to store the adjustment factor AD. That is, according to the embodiment of FIG. 15, a memory space for an adjustment factor has the size of 28 words, which is smaller than the size of the twiddle factor of FIG. 14B. Accordingly, the size of the parallel computational accelerator decreases, and the efficiency of memory increases.

Figure 16B:
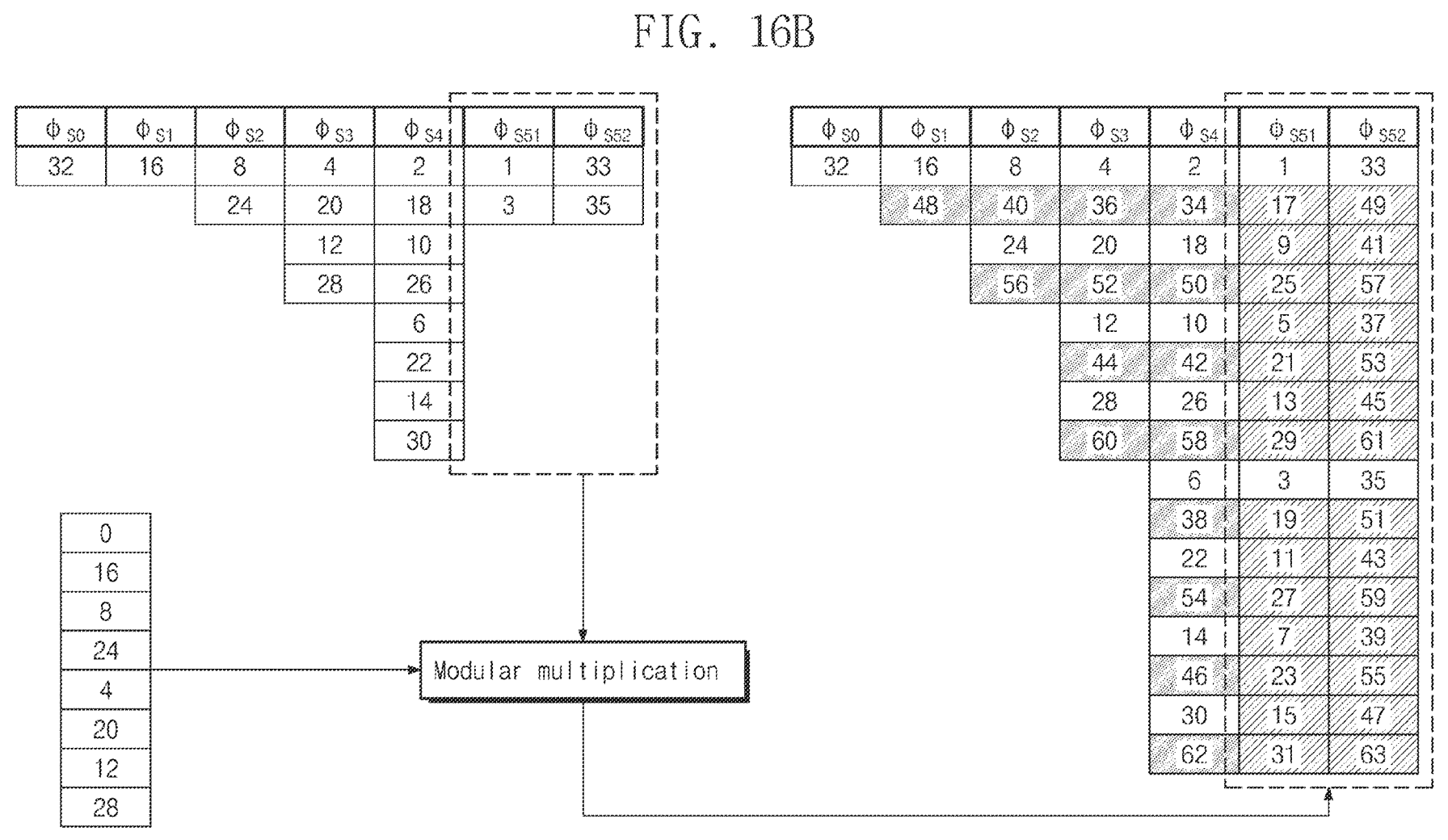

FIGS. 16A to 16C are diagrams for describing an operation of recovering a complete twiddle factor based on a simplified twiddle factor structure of FIG. 15. Referring to FIGS. 16A to 16C, compared to the twiddle factor of FIG. 14B, due to the simplification, the first twiddle factor $\varphi_{S1}$ does not include a factor of 48, the second twiddle factor $\varphi_{S2}$ does not include factors of 40 and 56, the third twiddle factor $\varphi_{S3}$ does not include factors of 36, 52, 44, and 60, the 51-th twiddle factor $\varphi_{S51}$ does not include factors of 17, 9, 25, 5, 21, 13, 29, 19, 11, 27, 7, 23, 15, and 31, and the 52-th twiddle factor $\varphi_{S52}$ does not include factors of 49, 41, 57, 37, 53, 45, 61, 51, 43, 59, 39, 55, 47, and 63.

In this case, factors omitted from (not included in) the first simplified twiddle factor $\varphi_{S1}$, the second simplified twiddle factor $\varphi_{S2}$, the third simplified twiddle factor $\varphi_{S3}$, and the fourth simplified twiddle factor $\varphi_{S4}$ may be recovered or obtained by performing the modular multiplication operation with a reference factor (0, 32). For example, as illustrated in FIG. 16A, the first simplified twiddle factor $\varphi_{S1}$ includes a factor of 16. Factors of 16 and 48 may be recovered or obtained by performing the modular multiplication operation on the factor of 16 and the reference factor (0, 32). The second simplified twiddle factor $\varphi_{S2}$ includes factors of 8 and 24. Factors of 8, 40, 24, and 56 may be recovered or obtained by performing the modular multiplication operation on the factors of 8 and 24 and the reference factor (0, 32). The third simplified twiddle factor $\varphi_{S3}$ includes factors of 4, 20, 12, and 28. Factors of 4, 36, 20, 52, 12, 44, 28, and 60 may be recovered or obtained by performing the modular multiplication operation on the factors of 4, 20, 12, and 28 and the reference factor (0, 32). The fourth simplified twiddle factor (p S4 includes factors of 2, 18, 10, 26, 6, 22, 14, and 30. Factors of 2, 34, 18, 50, 10, 42, 26, 58, 6, 38, 22, 54, 14, 46, 30, and 62 may be recovered or obtained by performing the modular multiplication operation on the factors of 2, 18, 10, 26, 6, 22, 14, and 30 and the reference factor (0, 32).

Factors omitted from (or not included in) the 51-th simplified twiddle factor $\varphi_{S51}$ and the 52-th simplified twiddle factor $\varphi_{S51}$ may be recovered or obtained by performing the modular multiplication operation with the adjustment factor AD. For example, as illustrated in FIG. 16B, the 51-th simplified twiddle factor $\varphi_{S51}$ includes factors of 1 and 3. Factors of 1, 17, 9, 25, 5, 21, 13, 29, 3, 19, 11, 27, 7, 23, 15, and 31 may be recovered or obtained by performing the modular multiplication operation on the factors of 1 and 3 and the adjustment factor AD.

The 52-th simplified twiddle factor $\varphi_{S52}$ includes factors of 33 and 35. Factors of 33, 49, 41, 57, 37, 53, 45, 61, 35, 51, 43, 59, 39, 55, 47, and 63 may be recovered or obtained by performing the modular multiplication operation on the factors of 33 and 35 and the adjustment factor AD.

In an embodiment, FIG. 16C shows the modular multiplication operation for factors. For convenience of description, a configuration of the modular multiplication operation for the 51-th simplified twiddle factor $\varphi_{S51}$ and the adjustment factor AD will be described with reference to FIG. 16C. However, the present disclosure is not limited thereto. For example, any other modular multiplication operation may be performed to be similar to the following description.

As illustrated in FIG. 16C, factors of a simplified twiddle factor are sequentially applied as a first input IN1 of the modular multiplication operation, and factors of the adjustment factor AD is sequentially applied as a second input IN2 of the modular multiplication operation. In this case, as illustrated in FIG. 16C, the result of the modular multiplication operation may correspond to the 51-th twiddle factor $\varphi_{S51}$ described with reference to FIG. 14B. That is, all the factors of the 51-th twiddle factor $\varphi_{S51}$ may be recovered or obtained by performing the modular multiplication operation on the 51-th twiddle factor $\varphi_{S51}$ with the reduced size and the adjustment factor AD.

In an embodiment, the above twiddle factor may be recovered or obtained by the processor 153 (refer to FIG. 2) by using the simplified twiddle factor. The simplified twiddle factor may be stored in the memory device 130 (refer to FIG. 1) or a separate memory or register.

A conventional scheme for processing a homomorphic ciphertext expressed by a polynomial uses a sequential processing operator such as a CPU. In this case, an issue that a computational time increases occurs. According to an embodiment of the present disclosure, a homomorphic ciphertext calculating accelerator may be implemented with dedicated hardware logic for homomorphic ciphertext computation, which includes parallel processing elements arranged in parallel. Accordingly, a speed with which a homomorphic ciphertext is computed may be improved without an increase in hardware complexity. Also, the parallel processing elements may have the SDF NTT hardware structure, and twiddle factors used in the SDF NTT hardware structure may be stored and managed in a memory in the form of a reduced size. In this case, the twiddle factors with the reduced size may be recovered to twiddle factors with normal sizes through the modular multiplication operation using the reference factor and the adjustment factors. Accordingly, the size of the memory or register for storing or managing the twiddle factors may decrease. This may mean that the size of the homomorphic ciphertext calculating accelerator decreases and the efficiency of memory is improved.

According to the present disclosure, a homomorphic ciphertext calculating accelerator includes processing elements arranged in parallel. In this case, a computational speed of the homomorphic ciphertext calculating accelerator may be improved without an increase in hardware complexity.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A homomorphic encryption calculating accelerator comprising:
   a parallel processing circuit configured to perform a polynomial multiplication operation in parallel on a plurality of input data corresponding to a degree N polynomial of a homomorphic ciphertext; and
   a combination circuit configured to generate a plurality of output data by performing the polynomial multiplication operation on an output of the parallel processing circuit,
   wherein the parallel processing circuit includes:
   a first parallel processing element configured to perform the polynomial multiplication operation on first input data among the plurality of input data; and
   a second parallel processing element configured to perform the polynomial multiplication operation on second input data among the plurality of input data,
   wherein the first parallel processing element and the second parallel processing element are arranged in parallel,
   wherein each of the first parallel processing element and the second parallel processing element has a single-path delay feedback (SDF) number theoretic transform (NTT) hardware structure, and
   wherein the combination circuit includes a first combination processing element configured to generate first output data and second output data by performing the polynomial multiplication operation on an output of the first parallel processing element and an output of the second parallel processing element.

2. The homomorphic encryption calculating accelerator of claim 1, wherein each of the first parallel processing element and the second parallel processing element includes (S-1) stages (S being a natural number greater than 1),
   wherein the first combination processing element includes one stage,
   wherein each of the stages included in the first parallel processing element, the second parallel processing element, and the first combination processing element has a Radix-R structure (R being a natural number), and
   wherein the N, the S, and the R satisfy an equation: $N=S^R$.

3. The homomorphic encryption calculating accelerator of claim 2, wherein the R is 2, 4, 8, or 16.

4. The homomorphic encryption calculating accelerator comprising:
   a parallel processing circuit configured to perform a polynomial multiplication operation in parallel on a plurality of input data corresponding to a degree N polynomial of a homomorphic ciphertext; and
   a combination circuit configured to generate a plurality of output data by performing the polynomial multiplication operation on an output of the parallel processing circuit,
   wherein the parallel processing circuit includes:
   a first parallel processing element configured to perform the polynomial multiplication operation on first input data among the plurality of input data; and
   a second parallel processing element configured to perform the polynomial multiplication operation on second input data among the plurality of input data,
   a third parallel processing element configured to perform the polynomial multiplication operation on third input data among the plurality of input data; and
   a fourth parallel processing element configured to perform the polynomial multiplication operation on fourth input data among the plurality of input data,
   wherein the first parallel processing element, the second parallel processing element, the third parallel processing element, and the fourth parallel processing element are arranged in parallel, and
   wherein each of the first parallel processing element, the second parallel processing element, the third parallel processing element, and the fourth parallel processing element has a single-path delay feedback (SDF) number theoretic transform NTT hardware structure.

5. The homomorphic encryption calculating accelerator of claim 4, wherein the combination circuit includes:
   a first combination processing element configured to perform a polynomial operation on an output of the first parallel processing element and an output of the third parallel processing element;
   a second combination processing element configured to perform the polynomial operation on an output of the second parallel processing element and an output of the fourth parallel processing element;
   a third combination processing element configured to generate first output data and second output data by performing the polynomial multiplication operation on odd-numbered term outputs of each of the first combination processing element and the second combination processing element; and
   a fourth combination processing element configured to generate third output data and fourth output data by performing the polynomial multiplication operation on even-numbered term outputs of each of the first combination processing element and the second combination processing element.

6. The homomorphic encryption calculating accelerator of claim 5, wherein each of the first parallel processing element, the second parallel processing element, the third parallel processing element, and the fourth parallel processing element includes (S−2) stages (S being a natural number greater than 2),
   wherein each of the first combination processing element, the second combination processing element, the third combination processing element, and the fourth combination processing element includes one stage, wherein each of the stages included in the first parallel processing element, the second parallel processing element, the third parallel processing element, the fourth parallel processing element, the first combination processing element, the second combination processing element, the third combination processing element, and the fourth combination processing element has a Radix-R structure (R being a natural number), and wherein the N, the S, and the R satisfy an equation: $N=S^R$.

7. The homomorphic encryption calculating accelerator of claim 6, further comprising:

a data input/output circuit configured to receive the plurality of input data from an external memory device and to provide the plurality of output data to the external memory device; and a processor configured to control the data input/output circuit, the parallel processing circuit, and the combination circuit.

8. The homomorphic encryption calculating accelerator of claim 7, wherein each of the first parallel processing element, the second parallel processing element, the third parallel processing element, the fourth parallel processing element, the first combination processing element, the second combination processing element, the third combination processing element, and the fourth combination processing element is configured to operate using a plurality of twiddle factors.

9. The homomorphic encryption calculating accelerator of claim 8, wherein the processor is configured to:

recover twiddle factors to be provided to the first parallel processing element, the second parallel processing element, the third parallel processing element, the fourth parallel processing element, the first combination processing element, and the second combination processing element, based on a modular multiplication operation on a simplified twiddle factor and a reference factor, and wherein the processor is further configured to:

recover twiddle factors to be provided to the third combination processing element and the fourth combination processing element, based on the modular multiplication operation on the simplified twiddle factor and an adjustment factor.

10. The homomorphic encryption calculating accelerator of claim 9, wherein the simplified twiddle factor is smaller in size than the twiddle factor.

11. An encryption system comprising:

a communication device configured to communicate with an external device;

an encryption device configured to generate encryption data by encrypting user data received from the communication device;

a memory device configured to store the encryption data;

a homomorphic encryption calculating accelerator configured to generate computed encryption data by performing a homomorphic encryption operation on the encryption data, wherein the computed encryption data are stored in the memory device; and a decryption device configured to generate decryption data by decrypting the computed encryption data stored in the memory device, wherein the homomorphic encryption calculating accelerator includes:

a parallel processing circuit configured to perform a polynomial multiplication operation in parallel on a plurality of input data corresponding to a degree N polynomial of the encryption data; and a combination circuit configured to generate a plurality of output data by performing the polynomial multiplication operation on an output of the parallel processing circuit, wherein the parallel processing circuit includes:

a first parallel processing element configured to perform the polynomial multiplication operation on first input data among the plurality of input data; and a second parallel processing element configured to perform the polynomial multiplication operation on second input data among the plurality of input data, wherein the first parallel processing element and the second parallel processing element are arranged in parallel, wherein each of the first parallel processing element and the second parallel processing element has a single-path delay feedback (SDF) number theoretic transform (NTT) hardware structure, and wherein the combination circuit includes a first combination processing element configured to generate first output data and second output data by performing the polynomial multiplication operation on an output of the first parallel processing element and an output of the second parallel processing element.

12. The encryption system of claim 11, wherein each of the first parallel processing element and the second parallel processing element includes (S−1) stages (S being a natural number greater than 1), wherein the first combination processing element includes one stage, wherein each of the stages included in the first parallel processing element, the second parallel processing element, and the first combination processing element has a Radix-R structure (R being a natural number), and wherein the N, the S, and the R satisfy an equation: $N=S^R$.

* * * * *